(12) United States Patent
Alqasimi et al.

(10) Patent No.: US 10,330,144 B1
(45) Date of Patent: Jun. 25, 2019

(54) LINEAR BI-STABLE COMPLIANT CRANK-SLIDER-MECHANISM

(71) Applicants: Ahmad Alqasimi, Tampa, FL (US); Craig Lusk, Lutz, FL (US)

(72) Inventors: Ahmad Alqasimi, Tampa, FL (US); Craig Lusk, Lutz, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/117,979

(22) Filed: Aug. 30, 2018

Related U.S. Application Data

(62) Division of application No. 15/198,627, filed on Jun. 30, 2016.

(60) Provisional application No. 62/199,606, filed on Jul. 31, 2015.

(51) Int. Cl.
*F16C 11/12* (2006.01)
*F16C 7/06* (2006.01)

(52) U.S. Cl.
CPC ............... *F16C 11/12* (2013.01); *F16C 7/06* (2013.01)

(58) Field of Classification Search
CPC .................................. F16C 11/12; F16C 7/06
See application file for complete search history.

(56) References Cited

U.S. PATENT DOCUMENTS 5,649,454 A * 7/1997 Midha ..................... F16H 21/44
267/160
6,215,081 B1 4/2001 Jensen et al.

7,874,223 B2 1/2011 Sugar et al.
8,301,272 B2 10/2012 Mankame et al.
(Continued)

FOREIGN PATENT DOCUMENTS

CN 1218335 9/2005
WO 2000058982 10/2000

OTHER PUBLICATIONS

Lusk, C. and Montalbano, P., 2011, "Design Concepts for Shape-Shifting Surfaces" in Proceedings of the 2011 Design Engineering Technical Conferences & Computers and Information in Engineering Conference, Washington, DC, Aug 29-31, 2011. DETC2011-47402.

(Continued)

*Primary Examiner* — Moshe Wilensky
(74) *Attorney, Agent, or Firm* — Paul Murty; Nilay Choksi; Smith & Hopen, P.A.

(57) ABSTRACT

A linear element with two stable points, it can be used as trust element allows for change in length. It can transform structure from one shape to another thus allowing for morphable configuration. A new model is presented herein for a linear bi-stable compliant mechanism and design guidelines for its use. The mechanism is based on the crank-slider mechanism. This model takes into account the first mode of buckling and post-buckling behavior of a compliant segment to describe the mechanism's bi-stable behavior. The kinetic and kinematic equations, derived from the Pseudo-Rigid-Body Model, were solved numerically and are represented in plots. This representation allows the generation of step-by-step design guidelines. Because different applications may have different input requirements, two different design approaches are described herein with different parameters subsets as inputs.

11 Claims, 27 Drawing Sheets

(56) References Cited

U.S. PATENT DOCUMENTS 8,573,091 B2    11/2013   Chen et al.

OTHER PUBLICATIONS

Lusk, C., 2011, "Quantifying Uncertainty for Planar Pseudo-Rigid Body Models" in Proceedings of the 2011 Design Engineering Technical Conferences & Computers and Information in Engineering Conference, Washington, DC, Aug 29-31, 2011. DETC2011-47456.

Smith, C. and Lusk, C., 2011, "Modeling and Parameter Study of Bi-stable Spherical Compliant Mechanisms" in Proceedings of the 2011 Design Engineering Technical Conferences & Computers and Information in Engineering conference, Washington, DC, Aug 29-31, 2011. DETC2011-47397.

Howell, L. L., Midha A., and Norton, T. W., 1996, "Evaluation of Equivalent Spring Stiffness for Use in a Pseudo-Rigid-Body Model of Large-Deflection Compliant Mechanisms," ASME Journal of Mechanical Design, 118(1):126-131.

Chen, G., Gou, Y. and Zhang, A., "Synthesis of Compliant Multistable Mechanisms Through Use of a Single Bi-stable Mechanism", Journal of Mechanical Design, 133(8), 081007 (Aug. 10, 2011) doi:10.1115/1.4004543.

Ishii, H. and Ting, K. L., "SMA Actuated Compliant Bi-stable Mechanisms", Mechatronics, vol. 14, Issue 4, May 2004, pp. 421-437.

Demirel, B. et al., "Compliant Impact Generator for Required Impact and contact Force" in Proceedings of International Mechanical Engineering Congress and Exposition, Boston, Massachusetts, Oct. 31-Nov. 6, 2008. IMECE2008-68796.

\* cited by examiner

LINEAR BI-STABLE COMPLIANT
CRANK-SLIDER-MECHANISM

CROSS-REFERENCE TO RELATED
APPLICATIONS

This nonprovisional application is a divisional of and claims priority to U.S. Nonprovisional patent application Ser. No. 15/198,627, entitled "Linear Bi-Stable Compliant Crank-Slider-Mechanism," filed Jun. 30, 2016 by the same inventors, which is a continuation of and claims priority to U.S. Provisional Patent Application No. 62/199,606, entitled "Linear Bi-Stable Compliant Crank-Slider-Mechanism (LB-CCSM)," filed Jul. 31, 2015 by the same inventors, the entirety of each application are incorporated herein by reference.

FEDERALLY SPONSORED RESEARCH OR
DEVELOPMENT

This invention was made with Government support under Grant No. CMMI-1053956 awarded by the National Science Foundation. The government has certain rights in the invention.

BACKGROUND

1. Field of the Invention

The claimed subject matter relates, generally, to surfaces, the shape of which can be changed in response to externally applied forces. More specifically, it relates to such surfaces that have a linear bi-stable compliant crank-slider-mechanism.

2. Brief Description of the Prior Art

A compliant mechanism is a flexible mechanism that derives some or all its motion (mobility) from the deflection of flexible segments, thereby replacing the need for mechanical joints. It transfers an input force or displacement from one point to another through elastic body deformation. The absence or reduction of mechanical joints impacts both performance and cost. Advantages include reduced friction and wear, increased reliability and precision, and decreased maintenance and weight. Moreover, cost is also affected by reduced assembly time and, in most cases, due to its hingeless design, the fabrication of such mechanisms can be produced from a single piece. Additionally, compliant mechanisms provide the designer with an effective way to achieve mechanical stability.

A compliant bi-stable mechanism achieves its stability within the designed range of motion, by storing and releasing strain energy in its compliant segments [Chen, G., Gou, Y. and Zhang, A., "Synthesis of Compliant Multistable Mechanisms Through Use of a Single Bi-stable Mechanism", Journal of Mechanical Design, 133(8), 081007 (Aug. 10, 2011) doi:10.1115/1.4004543]. Such a technique enables the mechanism to stay at its two stable positions without the need of an external power/force to stay there. Energy methods, combined with pseudo-rigid-body models, can be used to analyze such compliant mechanisms [Ishii, H. and Ting, K. L., "SMA Actuated Compliant Bi-stable Mechanisms", Mechatronics, Volume 14, Issue 4, May 2004, Pages 421-437].

These mechanisms are most commonly designed in two ways. One is using pseudo-rigid-body models, and the other is using topology optimization. Both approaches have utility. The design of the compliant portion of the unit cell components is accomplished through compliant mechanism synthesis.

There are three major approaches to the design and synthesis of compliant mechanisms: kinematic approximation methods, computationally intense methods, and linear and higher-order expansions of the governing equations. This disclosure is based primarily upon kinematic approximation methods.

The kinematic approximation or Pseudo-Rigid-Body Model (PRBM) approach works by identifying similarities between compliant mechanisms and rigid-body mechanisms. It has proved effective in identifying numerous compliant analogues to ubiquitous planar rigid-body mechanisms such as four-bar and crank-slider mechanisms. The chief criticisms of this approach are that the models are approximate and have limited, albeit known, accuracy. Moreover, the identification between flexure geometries and rigid-body mechanisms has been limited to a small but versatile set of planar configurations.

Computationally intense approaches typically combine finite element analysis with optimization to calculate optimal geometries in response to load and motion specifications. This approach has been successful, but has also been criticized for producing results identical to those produced more quickly by the PRBM approach, or results that are not physically realizable. As a general rule, this approach is more capable and accurate than the PRBM approach, but also more time consuming.

The third approach, which relies on linear and higher-order expansions of the governing equations, is well-known in precision mechanisms research, and relies heavily on flexures that are small and undergo small, nearly linear, deflections. This approach uses flexures much smaller than the overall mechanism size, so it is not generally applicable to millimeter-scale and smaller mechanisms. These techniques are important but do not have a direct bearing on the claimed subject matter disclosed herein.

Systems for subdividing surfaces in the development of finite element algorithms using node definition and degrees of freedom are known. These same subdivisions schemes are applicable to the design of the novel shape-shifting surfaces disclosed hereinafter. The prior art includes techniques for node placement in a given shape. For example, in Finite Element models, the behavior between nodes is typically determined by interpolating functions. In the multi-stable shape-shifting system disclosed hereinafter, a kinematic scheme is required to fill the gaps between nodes. Thus, kinematic skeletons are developed which have the same number of nodes (typically revolute joints) and the same number of degrees of freedom. Methods for enumerating all possible kinematic linkages with a given number of degrees of freedom are known. The simplest systems satisfying degree of freedom requirements are preferred. For example, triangular elements with additional nodes along the edges and center-point nodes are known.

Tiling systems, periodic and aperiodic, are methods for subdividing surfaces and as such have been extensively studied by mathematicians and artists since antiquity. The three regular tilings are: 1) equilateral triangles only, 2) squares only, and 3) regular hexagons only. There are eight Archimedean tilings, and there are aperiodic Penrose kite-and-dart tiling systems. The regular tilings are simple and require the fewest different types of unit cells. Some of the Archimedian tilings use polygons with several sides, yielding generous angles and areas to work with, which may be advantageous. Penrose tiles are specifically shaped quadrilaterals that can be assembled in multiple, non-periodic ways.

In 1827, Carl Fredrich Gauss published his 'Theorema Egregium' which is the foundational result in differential geometry. The basic result is that small triangles do not change their shape when bent and that there is a fundamental difference in the shape of triangles that are planar (the sum of the angles is equal to 180 degrees) and the shape of triangles on a sphere (the sum of the angles is always more than 180 degrees) and the shape of triangles on a hyperbolic or saddle-shaped surface (the sum of the angles is always less than 180 degrees). His result means that spheres cannot be made into planes without crumpling or tearing or stretching (distorting) the surface. This fundamental geometric limitation makes the building of certain types of curved surfaces (those with two non-zero principal curvatures) intrinsically more difficult than working with planar surfaces (both principal curvatures equal to zero) or developable surfaces (one principal curvature equal to zero).

A surface is defined as a material layer constituting such a boundary. Examples of this are walls, ceilings, doors, tables, armor, vehicle bodies, etc. However, in some cases, it may be valuable for these surfaces to change shape while still maintaining rigidity in the direction normal to the surface. In addition, having surfaces able to change between two different sizes on demand and stabilize in those sizes may be of even more value. One valuable application of size changing surfaces may be rigid containers, for example milk crates, trash barrels, dumpsters, laundry baskets, suit cases, truck beds, freight trains, trash compactors, etc. Such containers are designed for large volumes, however, when not in use, may become cumbersome. Thus, containers with large volumes when in use and small volumes when empty are of value. This includes the ability for containers to maintain large or small sizes both when in use and when empty.

This leads to a need for innovation that allows conventional surfaces to achieve new functionality, to be constructed more precisely, or at lower cost. More particularly, a low-cost modular building system with customizable degrees-of-freedom and stiffness with stability in multiple positions is needed. In addition to potential savings when a new barrier is erected, an innovative system would provide new methods and functionality to surfaces and objects.

Objects that function as physical barriers or supporting surfaces include walls, table tops, shelves, floors, ceilings, stairs, vehicle bodies, and pipelines. Conventional methods for constructing these barriers can be costly, but even when they are inexpensive, the numbers of these kinds of objects mean that they represent a significant economic investment. Such barriers often incur additional costs when they require modification or removal. Thus there is a need for a surface, and a method for designing such surface, having a shape that may be modified or adjusted without damaging the surface or rebuilding it, and that has stability in multiple positions or shapes.

Accordingly, what is needed is a single bi-stable mechanism or parallel/serial array of such mechanisms. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed subject matter should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY

The long-standing but heretofore unfulfilled need for a linear bi-stable compliant crank-slider-mechanism that requires no certain amount of rigid or flexible segments to perform its intended function is now met by a new, useful, and nonobvious invention.

In an embodiment, the current version is a substantially linear, bi-stable compliant crank-slider mechanism. The apparatus includes a first and a second stable position. The first segment (rigid or flexible) has a first end and a second end. The first end is fixed in place along the x-axis. The second segment (rigid or flexible) also has a first end and a second end. A living hinge is between and couples the second end of the first segment and the first end of the second segment. The living hinge is the apex of the apparatus and moveable in the x-axis and y-axis during the transition between the first and second stable position. A linear compliant joint is placed at the second end of the second segment on the x-axis and is only slideable along the x-axis during transition between first and second stable position. The second end of the second segment is distal to the first end of the first segment in the first stable position and proximal in the second stable position.

A characteristic pivot is placed within the first segment and splits the first segment into a fixed component and a hinged portion. The fixed component includes the first end of the first segment and the hinged portion includes the second end of the first segment. The fixed component also remains fixed in place at an angle relative to said x-axis (e.g., greater than 5° and less than 85°) during transition between the first and second stable position. Optionally, the second segment may have an angle in the first stable position that is presented over a range of stiffness coefficient ratios. The hinged portion rotates in a counterclockwise direction from the first stable position to the second stable position and in a clockwise direction from the second stable position to the first stable position. The first and second segments maintain stiffness in a direction normal to a surface of the mechanism in the first and second stable positions. Optionally, the first segment of the crank-slider mechanism can experience a measurable deflection while the second segment can either experience a measurable deflection or act as a force/displacement transmitter.

The crank-slider mechanism may have the hinged and fixed component of the first segment in a straight position relative to each other in the first stable position and angled relative to each other in the second stable position.

The crank-slider mechanism may have a first buckling pivot within the second segment such that the second segment can rotate about the first buckling pivot. Additionally, there may be a second buckling pivot within the second segment which in turn creates a buckling segment between the first and second buckling pivots. Furthermore, the buckling segment remains fixed between the first buckling pivot and the second buckling pivot.

The displacement of the linear compliant joint along the x-axis may be parallel to a force applied to transition the crank-slider mechanism between the first and second stable positions.

In a separate embodiment, the claimed subject matter is a method of fabricating a substantially linear, bi-stable, compliant crank-slider mechanism, producing predictable and controllable length changes between a first stable shape and a second stable shape. The design is constrained by the maximum force required to actuate the shape changes and by the maximum linear deflection of the crank-slider mechanism. The method includes identifying the first and second stable position. The maximum linear deflection must be defined and include a first segment and a second segment joined together by a living hinge. The value of an initial angle of the first segment relative to the x-axis must be defined. The length of the first and second segments must be defined based on the maximum linear deflection desired and the initial angle of the first segment. The initial angle of the second segment relative to the x-axis and the maximum vertical deflection of the crank-slider mechanism must be defined. The non-dimensional value of a maximum height of the crank-slider mechanism must be defined based on the maximum vertical deflection and a pseudo-rigid-body-model angle of the first segment must be defined at the maximum vertical deflection of the crank-slider mechanism. The stiffness coefficient ratio of the crank-slider mechanism, a value for a width of the first and second segment, and a non-dimensional force of the crank-slider mechanism must be defined.

The maximum actuation force needed to transition the crank-slider mechanism between the first stable position and the second stable position must be defined based on the non-dimensional force. The final step would be to fabricate the crank-slider mechanism based on the foregoing steps.

These and other important objects, advantages, and features of the claimed subject matter will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION

In the following detailed description, reference is made to the accompanying drawings, which form a part thereof, and within which are shown by way of illustration specific embodiments by which the claimed subject matter may be practiced. It is to be understood that other embodiments may be utilized and structural changes may be made without departing from the scope of the claimed subject matter.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

In an embodiment, the claimed subject matter is a linear bi-stable compliant mechanism that can be customized based on its design. In another embodiment, the claimed subject matter is a method of fabricating a mechanism that would produce a linear bi-stable mechanism, (i.e., the mechanism's displacement is parallel to the applied force). Generally, the mechanism described herein allows production of predictable and controllable length changes in certain mechanical systems, allowing the morphing from one specific shape into a different specific shape. This type of design can be used in shape-shifting surfaces [Lusk, C. and Montalbano, P., 2011, "Design Concepts For Shape-Shifting Surfaces" in Proceedings of the 2011 Design Engineering Technical Conferences & Computers and Information in Engineering Conference, Washington, D.C., Aug. 29-31, 2011. DETC2011-47402] as an attachment to provide bi-stability to its surfaces. Common applications for bi-stable mechanisms include switches, self-closing gates, hinges and closures. The mechanism's footprint can also be specified based on the method of fabrication described herein.

The pseudo-rigid-body model (PRBM) is a practical approach used herein to analyze and synthesize certain embodiments of the linear bi-stable compliant crank-slider-mechanism (LBCCSM). The approximations used in the PRBM were first developed by Howell et al., and works by incorporating the similar behavior between rigid-body mechanisms and compliant mechanisms [Howell, L. L., Midha A., and Norton, T. W., 1996, "Evaluation of Equivalent Spring Stiffness for Use in a Pseudo-Rigid-Body Model of Large-Deflection Compliant Mechanisms," ASME Journal of Mechanical Design, 118(1):126-131]. The LBCCSM models are based on two existing PRBMs, the fixed-pinned PRBM and the initially curved pinned-pinned PRBM [Lusk, C., 2011, "Quantifying Uncertainty For Planar Pseudo-Rigid Body Models" in Proceedings of the 2011 Design Engineering Technical Conferences & Computers and Information in Engineering Conference, Washington, D.C., Aug. 29-31, 2011. DETC2011-47456].

Figure 1A:
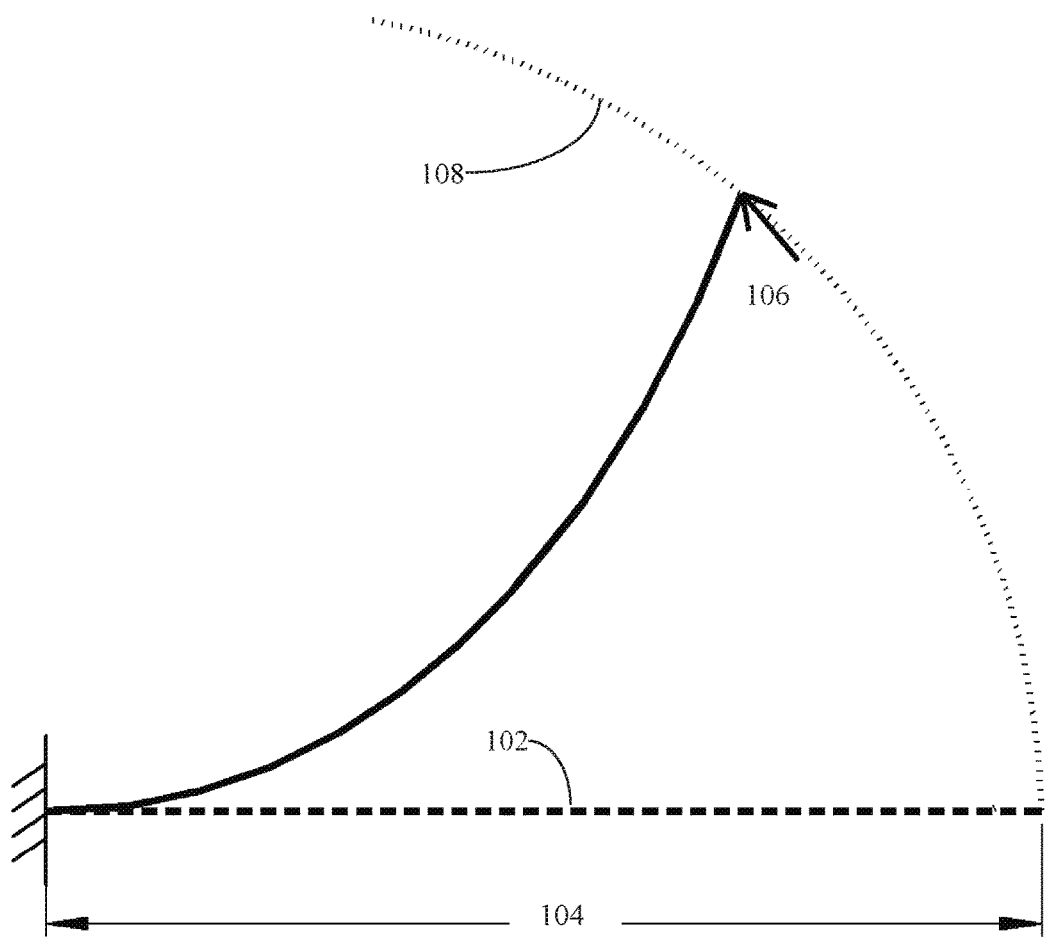
FIG. 1A shows an elastic Fixed-Pinned cantilever beam.

FIG. 1A illustrates an elastic fixed-pinned cantilever beam, where the fixed-pinned cantilever beam depicts first segment 100 when force 106 is applied to a pinned end of first segment 100. Force 106 causes the pinned end of first segment 100 to follow a path of travel, indicated by reference numeral 108, from undeflected position 102. First segment 100 further has length 104 that is straight in undeflected position 102 and "curved" after following path of travel 108.

Figure 1B:
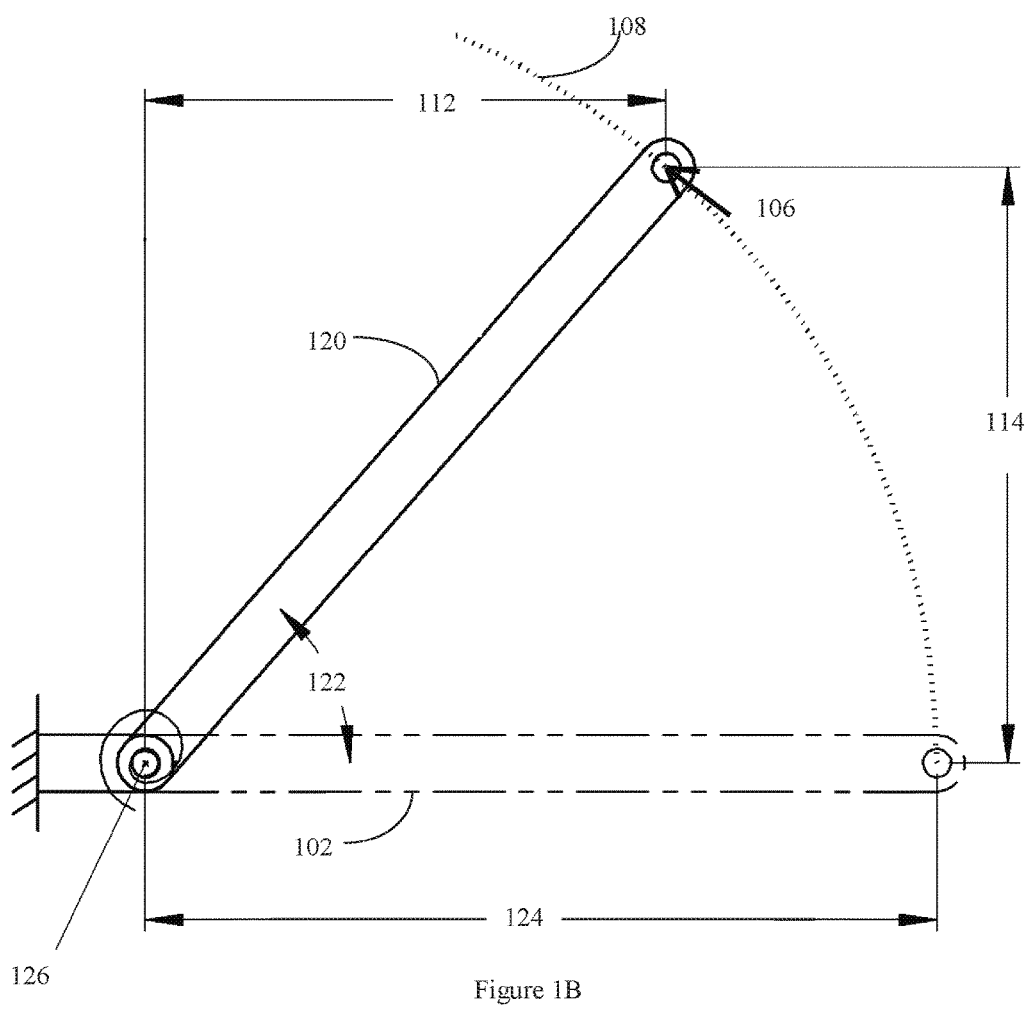
FIG. 1B shows its Pseudo-Rigid-Body Model.

FIG. 1B depicts a PRBM of FIG. 1A, including pseudo-rigid-body link 120 positioned at pseudo-rigid-body angle $\Theta_1$ 122. Pseudo-rigid-body link 120 has characteristic radius ($\gamma L_1$) 124 and terminates on a fixed end at characteristic pivot 126. Reference numerals 112 and 114 indicate the horizontal distance and vertical distance, respectively, of the resulting position of pseudo-rigid-body link 120 as force 106 causes pseudo-rigid-body link 120 to follow path of travel 108.

Figure 2A:
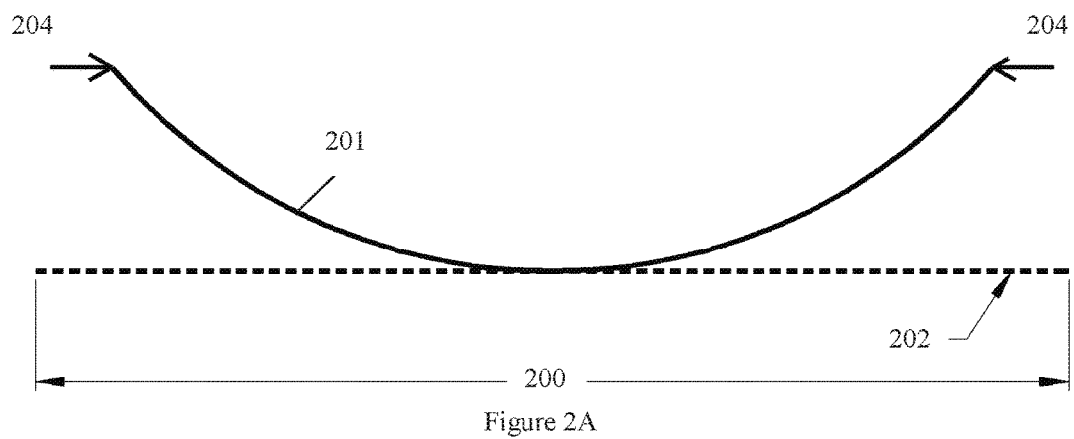
FIG. 2A shows an elastic Pinned-Pinned cantilever beam.

Referring now to FIG. 2A, an elastic pinned-pinned cantilever beam is illustrated, where the pinned-pinned cantilever beam depicts second segment 201 when force 204 is applied to the pinned ends of second segment 201. Force 204 causes the pinned ends of second segment 201 to "curve" from undeflected position 202 of second segment 201. Second segment 201 further has predetermined length 200.

Figure 2B:
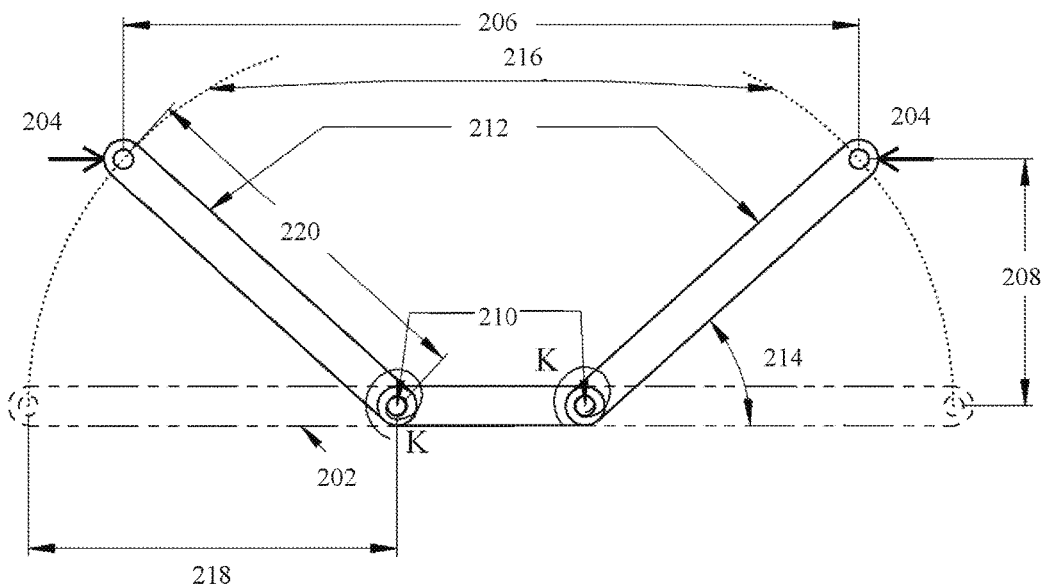
FIG. 2B shows its Pseudo-Rigid-Body Model.

FIG. 2B, a PRBM of FIG. 2A, including pseudo-rigid-body links 212, each having length ($\gamma L_2/2$) 220, positioned at pseudo-rigid-body angle $\Theta_2$ 214. Pseudo-rigid-body links 212 each have characteristic radius ($\gamma L_2/2$) 218 and characteristic pivots 210. Reference numerals 206 and 208 indicate the horizontal distance and vertical distance, respectively, of the resulting position of pseudo-rigid-body link 212 as forces 204 cause pseudo-rigid-body links 212 to follow a path of travel indicated by reference numeral 216.

Figure 3:
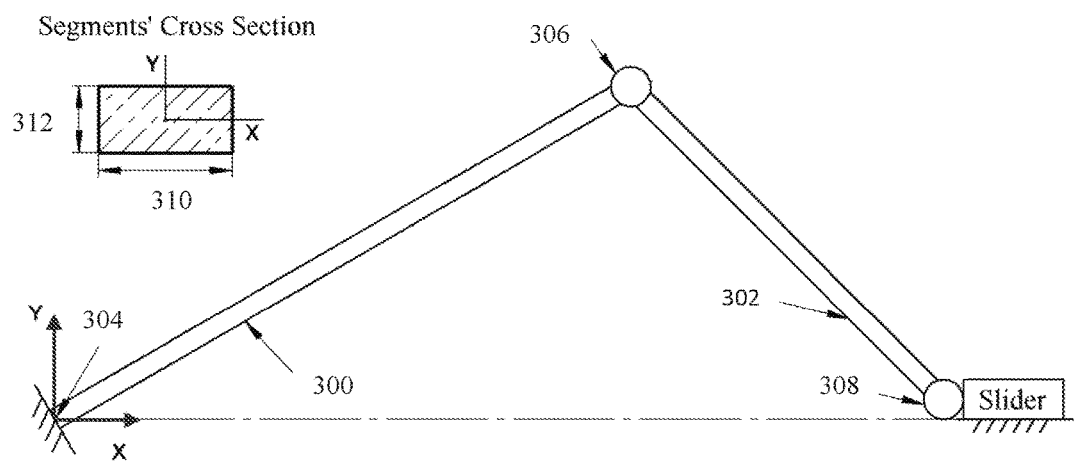
FIG. 3 depicts the mechanism model considered. Point A is fixed where point B and C are considered as pins or living hinges.

FIG. 3 depicts an embodiment of an LBCCSM. The LBCCSM includes first compliant segment ($L_1$) 300 and second compliant segment ($L_2$) 302 coupled together at an end via compliant joint 306. An opposite end of compliant segment 300 terminates at fixed point 304, which is a fixed end point of the LBCCSM. An opposite end of compliant segment 302 terminates at compliant joint 308, which is configured to slide along the x axis. FIG. 3 further depicts a cross section of segments 300, 302 with reference numeral 310 indicating a thickness of segments 300, 302 and reference numeral 312 indicating a width of segments 300, 302.

Structure

Figure 4:
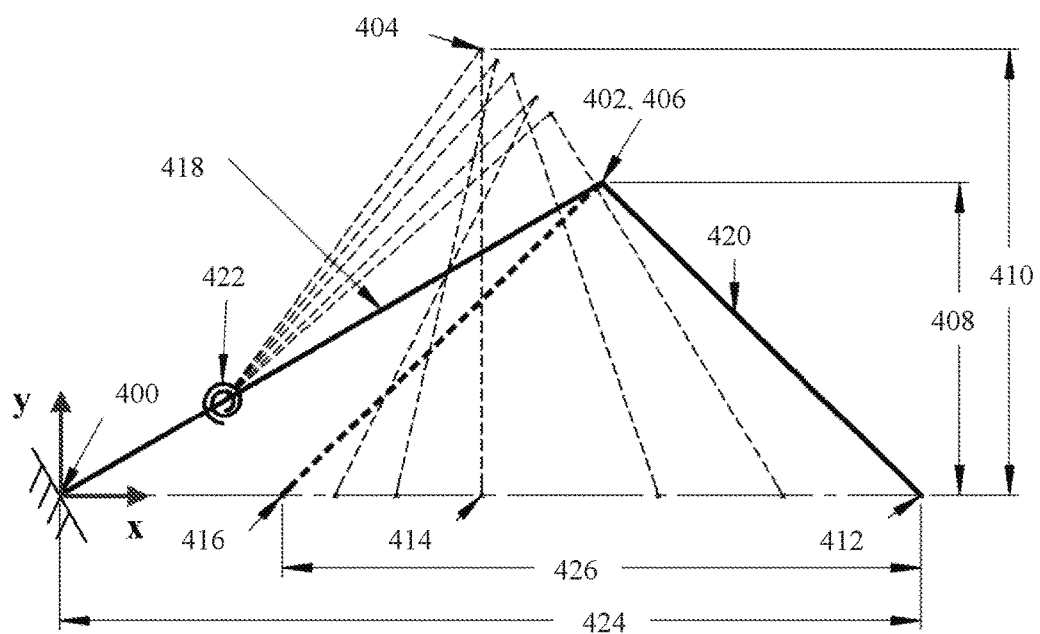
FIG. 4 shows the first case of the LBCCSM model.

In an embodiment, as seen in FIG. 4, first segment 418 experiences deflection, while second segment 420 does not experience deflection and only acts as a force/displacement transmitter. On one end, first segment 418 includes fixed point 400 to provide a fixed end point of the mechanism. On its opposite end, first segment 418 is coupled to an end of second segment 420 at compliant joint 402. Similarly, on its opposite end, second segment 420 includes compliant joint 412. The positions of compliant joints 402, 412 are shown in FIG. 4 when no external force is being applied to the mechanism. As such, it can be seen that compliant joints 402, 412 correspond to one another. Reference numeral 406 refers to a compliant joint hinge in same position as compliant joint 402; however, compliant joint 406 corresponds to compliant joint 416, which is similar to compliant joint 412, just displaced along the x axis by distance 426.

Still referring to FIG. 4, reference numeral 424 indicates a horizontal distance from fixed point 400 to compliant joint 412. Reference numeral 408 indicates the vertical distance to compliant joints 402, 406. Reference numeral 404 indicates the same compliant joint as compliant joints 402, 406, just at a maximum vertical position corresponding to distance 410. Reference numeral 414 indicates the same compliant joint as compliant joints 412, 416, just corresponding to compliant joint 404. Characteristic pivot 422 is the joint that allows the foregoing compliant joints to change positions. This will become clearer as this specification continues.

Figure 5A:
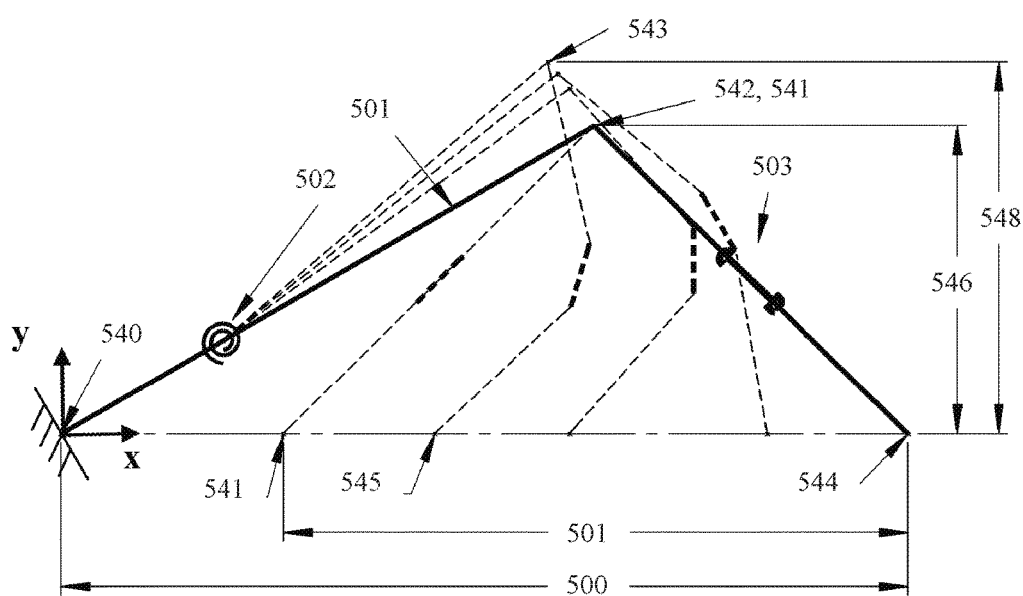
FIG. 5A shows the second case of the LBCCSM model.

Referring now to FIG. 5A, an embodiment of the LBCCSM is shown where first segment 501 experiences deflection, similar to FIG. 4, but second segment 503 experiences buckling. Second segment 503 follows a path of travel, as seen in FIG. 4B.

Figure 5B:
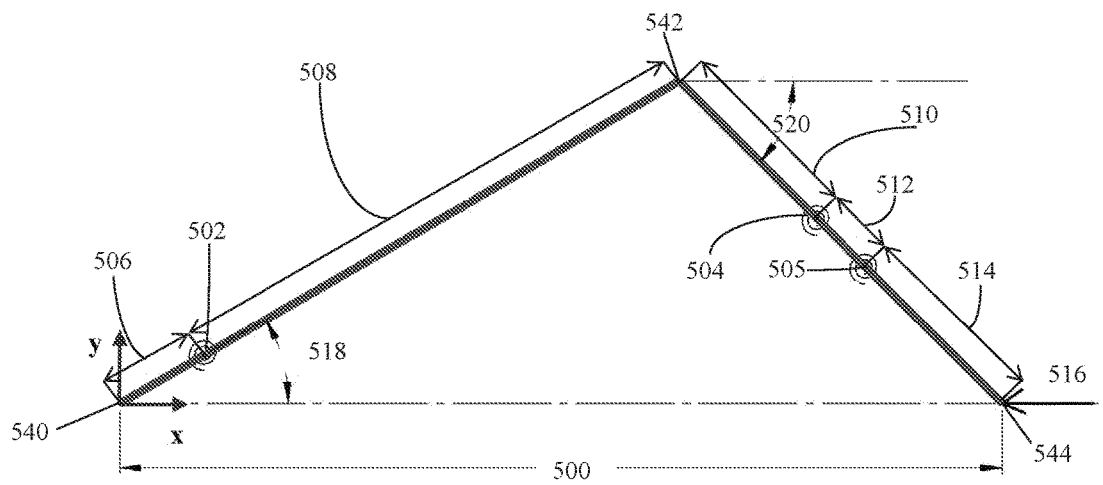
FIG. 5B shows the LBCCSM model at an initial state.

Referring now to FIG. 5B, the notation used in the analysis of the embodiment of FIG. 5A is shown in a first position of the LBCCSM. FIG. 5B also illustrates the relationship between the LBCCSM and its equations. Different reference numerals are used for clarity purposes only. Fixed end point 540 and compliant joint 544 are separated by horizontal distance 500. Reference numeral 502 indicates the characteristic pivot of first segment 501, and reference numerals 504, 505 represent the characteristic pivot of second segment 503 at each of their respective positions. Each characteristic pivot has a corresponding stiffness. Distance 506 ($(1-\gamma)L_1$) represents the distance between fixed end point 540 and characteristic pivot 502, and distance 508 ($\gamma L_1$) represents the distance between fixed end point 502 and compliant joint 542. Distance 510 represents the distance ($\gamma L_2/2$) between compliant joint 542 and end position 504 of characteristic pivot 504, 505. Distance 514 represents the distance ($\gamma L_2/2$) between compliant joint 544 and end position 505 of characteristic pivot 504, 505. Distance 510 can have the same value as distance 514, thus providing a synchronous buckling of second segment 503 between compliant joint 542 and compliant joint 544. Distance 512 represents the length ($(1-\gamma)L_2$) of the buckling segment between end points 504, 505. Reference numeral 516 depicts the force and direction thereof as applied to compliant joint 544. Angle 518 is the angle ($\theta_1$) at which first segment 501 lies in relation to the x axis, and angle 520 is the initial angle ($\theta_{2i}$) at which second segment 503 lies in relation to the x axis.

Figure 5C:
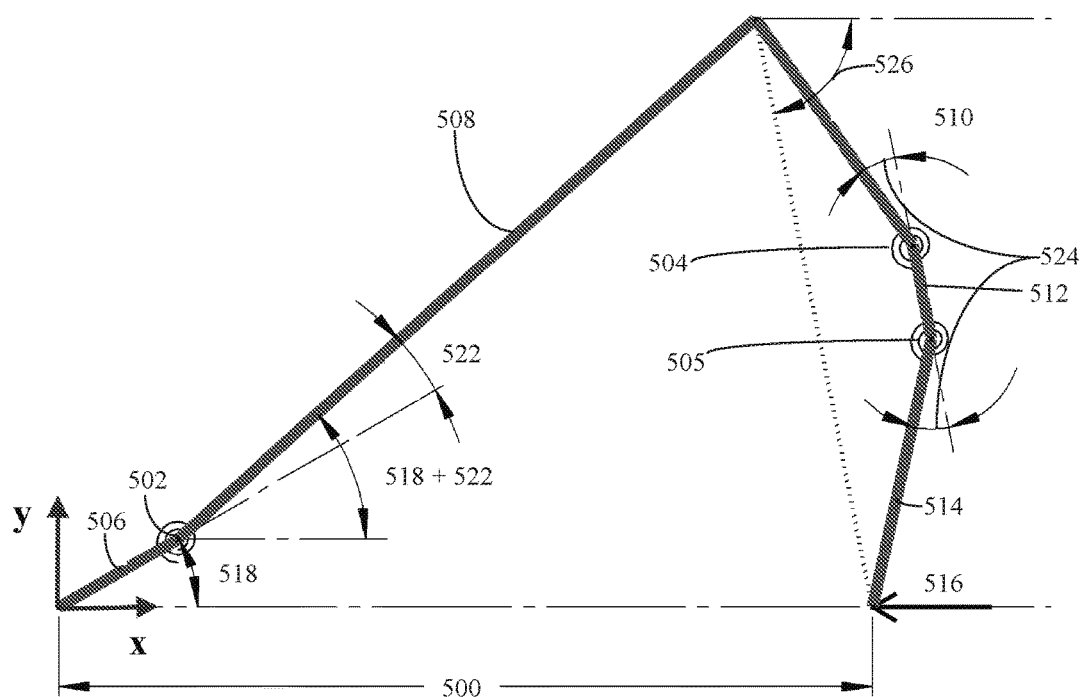
FIG. 5C shows the LBCCSM model at an intermediate state.
Figure 5D:
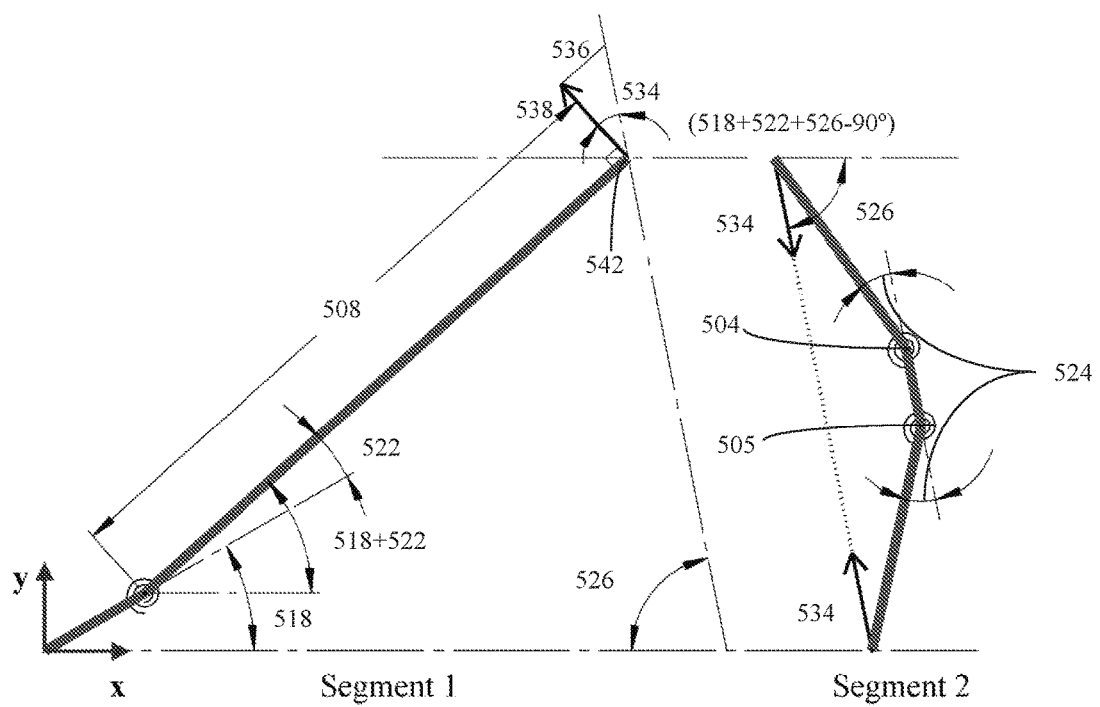
FIG. 5D depicts internal force analysis.

Referring now to FIGS. 5C-5D, the notation used in the analysis of the embodiment of FIG. 5A is shown in a second position of the LBCCSM. FIG. 5C also illustrates the relationship between the LBCCSM and its equations. Whereas angle 518 (i.e., angle ($\theta_1$) at which segment 506 of first segment 501 lies in relation to the x axis) remains the same, angle 522 is the PRBM angle ($\Theta_1$) of first segment 501 relative to the initial position of segment 508, such that the angle between segment 508 and the x axis is the sum of angle 518 and angle 522. Angle 524 is the PRBM angle ($\Theta_2$) of second segment 503 when second segment 503 buckles at points 504, 505. Angle 526 is the changing angle ($\theta_2$) at which second segment 503 lies in relation to the x axis.

Referring specifically to FIG. 5D, reference numeral 534 represents the buckling force of second segment 503, and reference numeral 536 represents the passive force on first segment 501 resulting from buckling force 534 on second segment 503. Reference numeral 538 represents the tangent force at the tip of first segment 501 when undergoing morphing from one shape to another.

Methodology

Figure 6A:
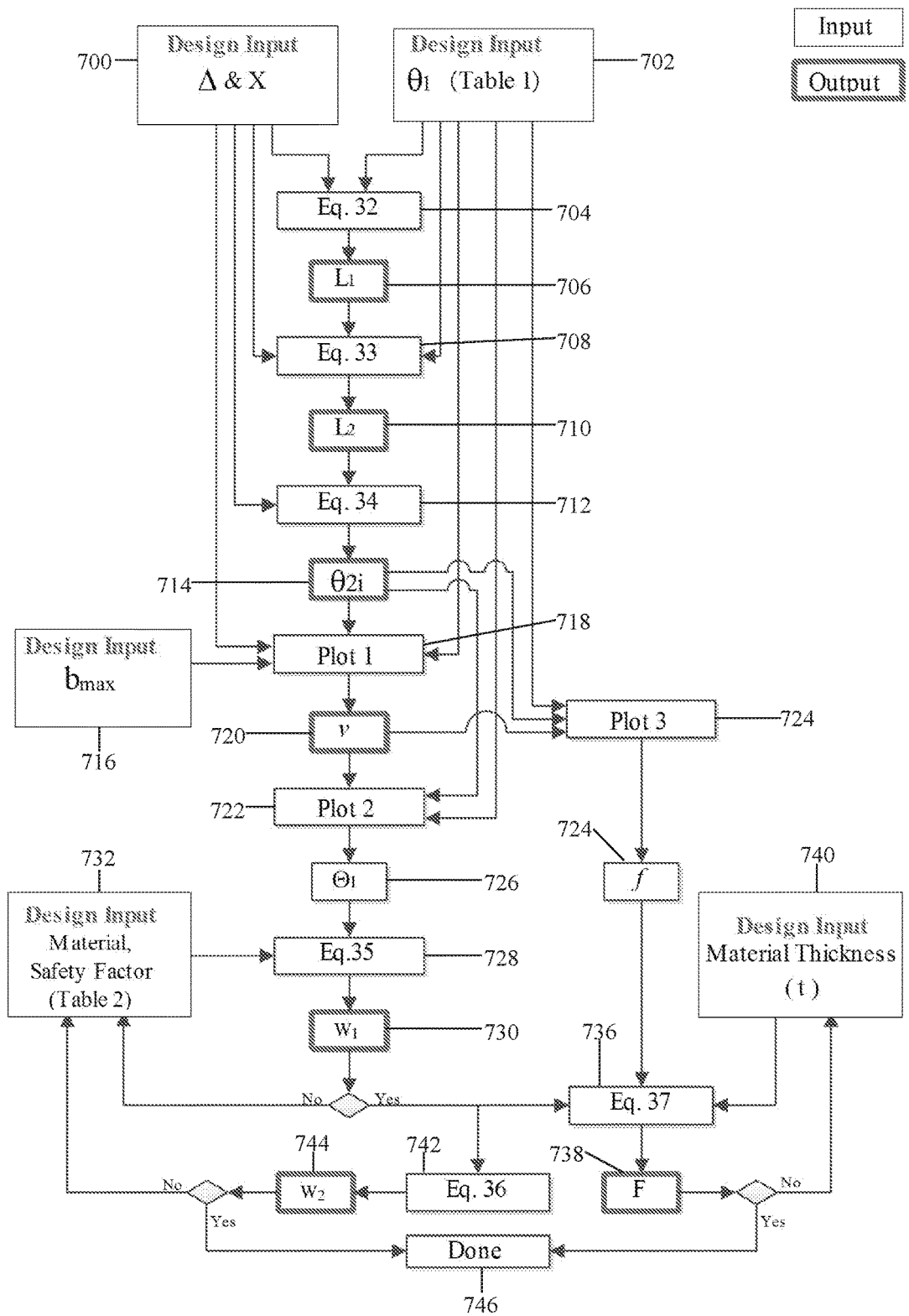
FIG. 6A is a design flow chart for the first approach.
Figure 8A:
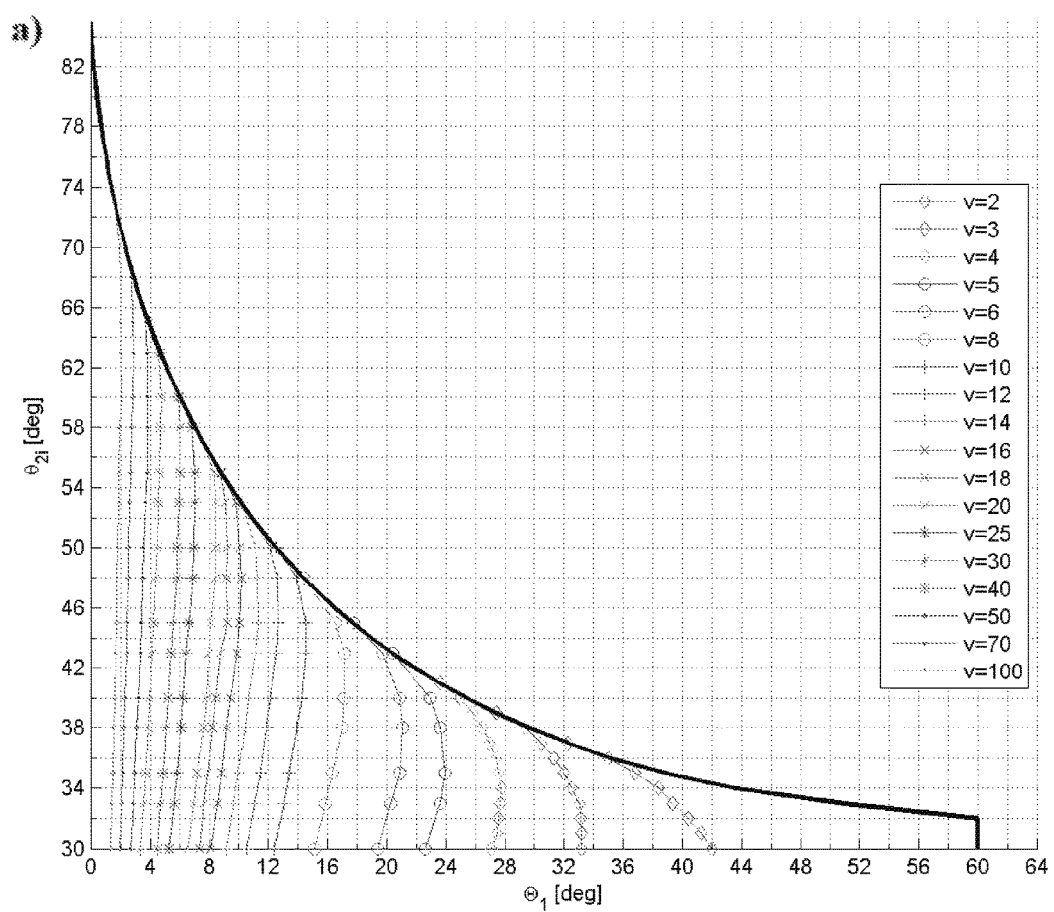
FIG. 8A is a design plot generated using the LBCCSM model that depicts the three selected values of ($\theta_1$), the relationship between ($\Theta_1$) and ($\theta_{2i}$), presented over a range of stiffness coefficient ratios (v).
Figure 8B:
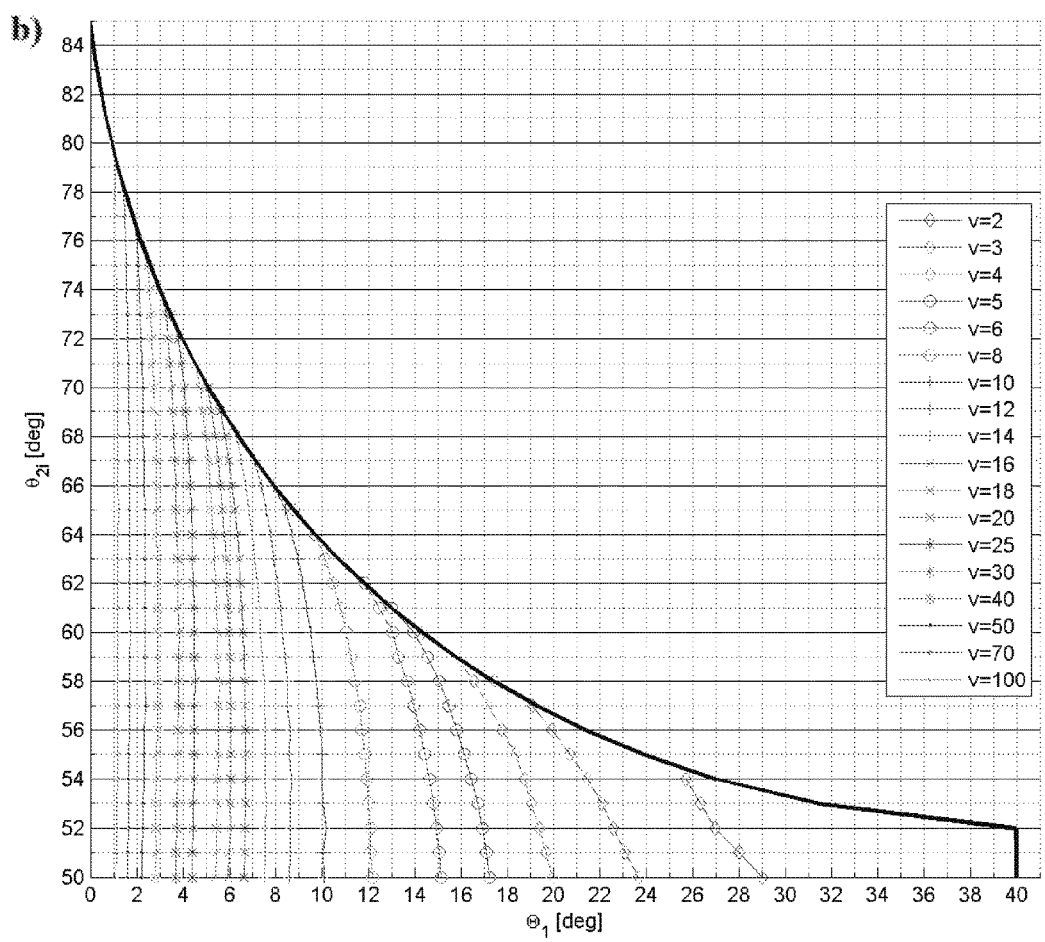
FIG. 8B is a design plot generated using the LBCCSM model that depicts the three selected values of ($\theta_1$), the relationship between ($\Theta_1$) and ($\theta_{2i}$), presented over a range of stiffness coefficient ratios (v).
Figure 8C:
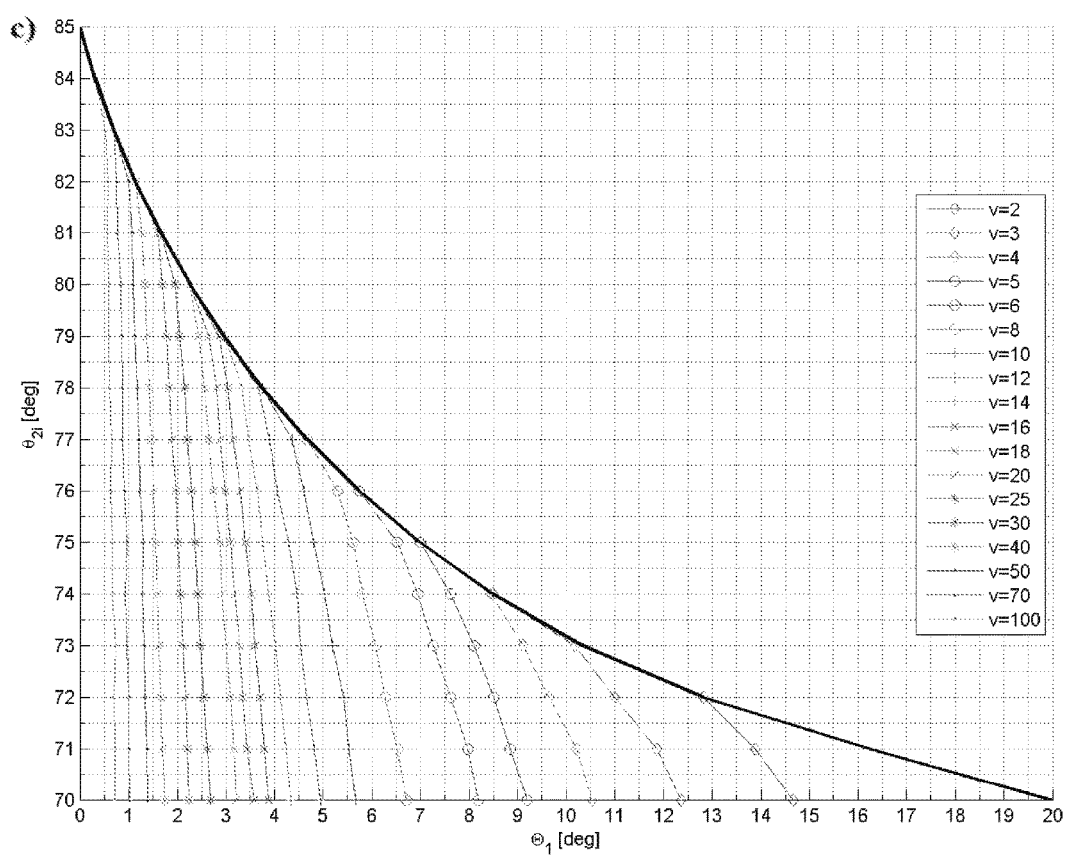
FIG. 8C is a design plot generated using the LBCCSM model that depicts the three selected values of ($\theta_1$), the relationship between ($\Theta_1$) and ($\theta_{2i}$), presented over a range of stiffness coefficient ratios (v).
Figure 9A:
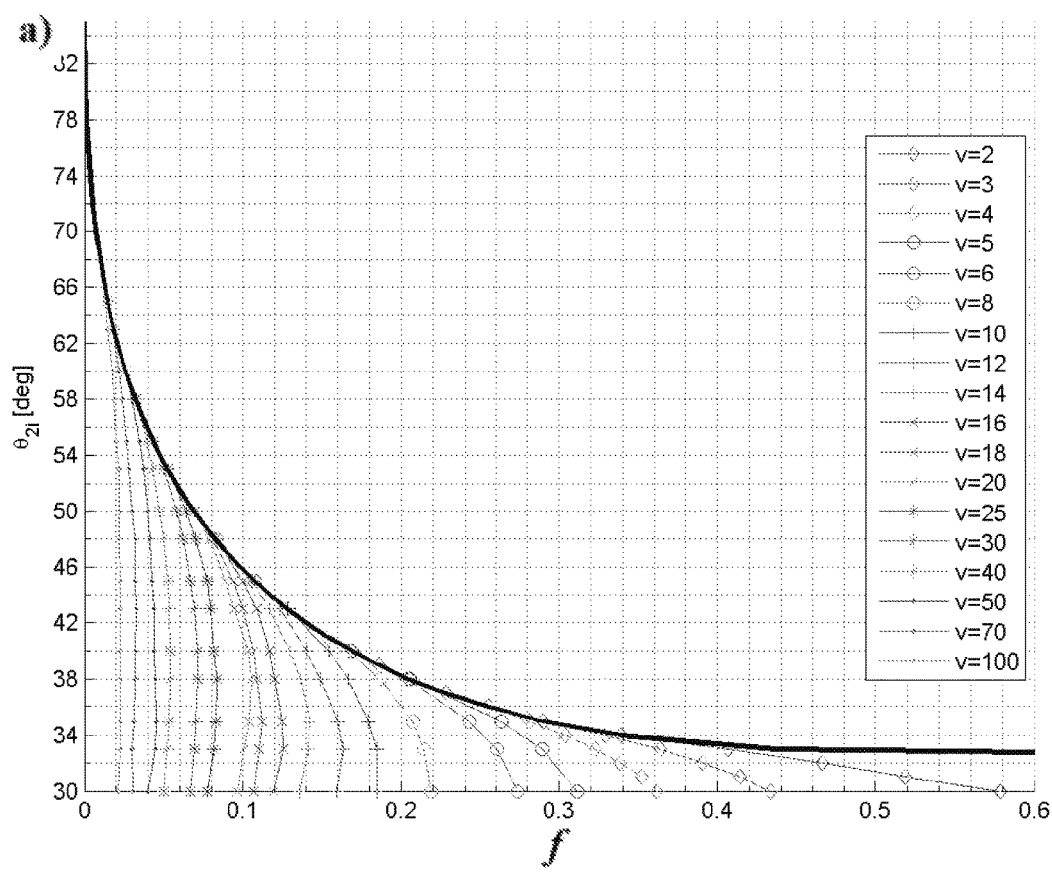
FIG. 9A is a design plot generated using the LBCCSM model that depicts the three selected values of ($\theta_1$), the relationship between ($\theta_{2i}$) and (f), presented over a range of stiffness coefficient ratios (v).
Figure 9B:
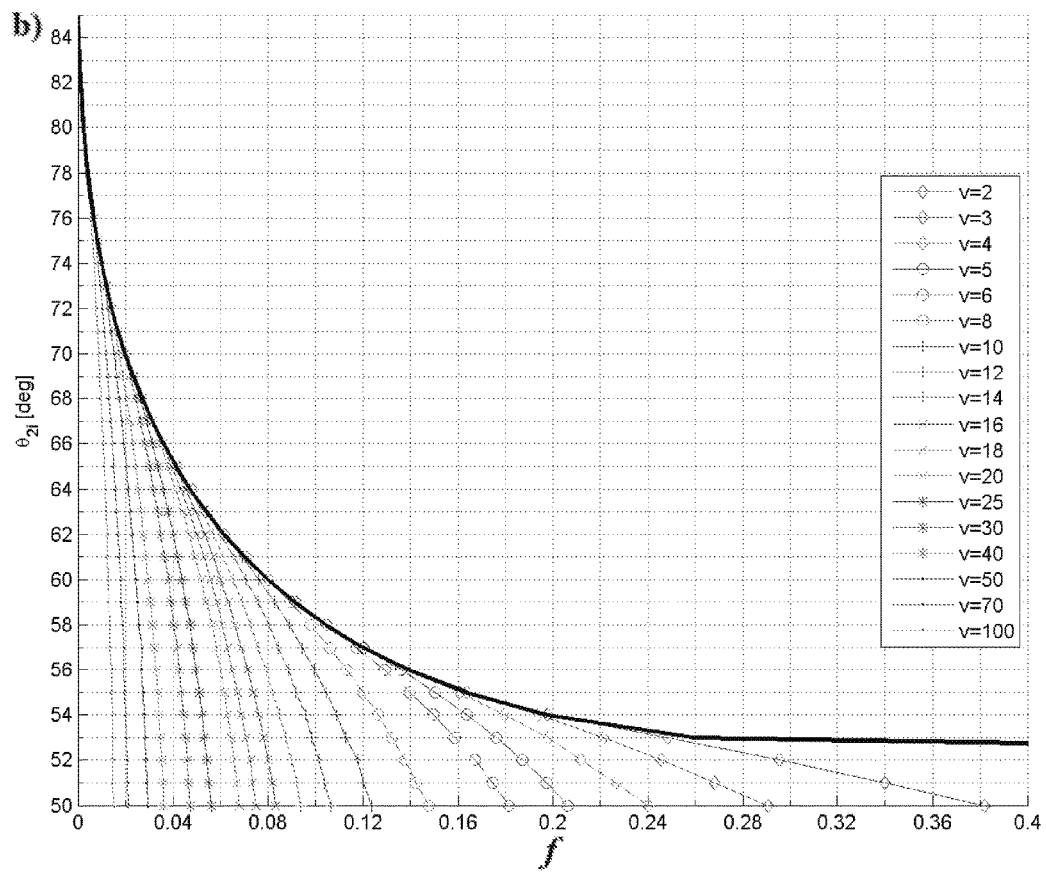
FIG. 9B is a design plot generated using the LBCCSM model that depicts the three selected values of ($\theta_1$), the relationship between ($\theta_{2i}$) and (f), presented over a range of stiffness coefficient ratios (v).
Figure 9C:
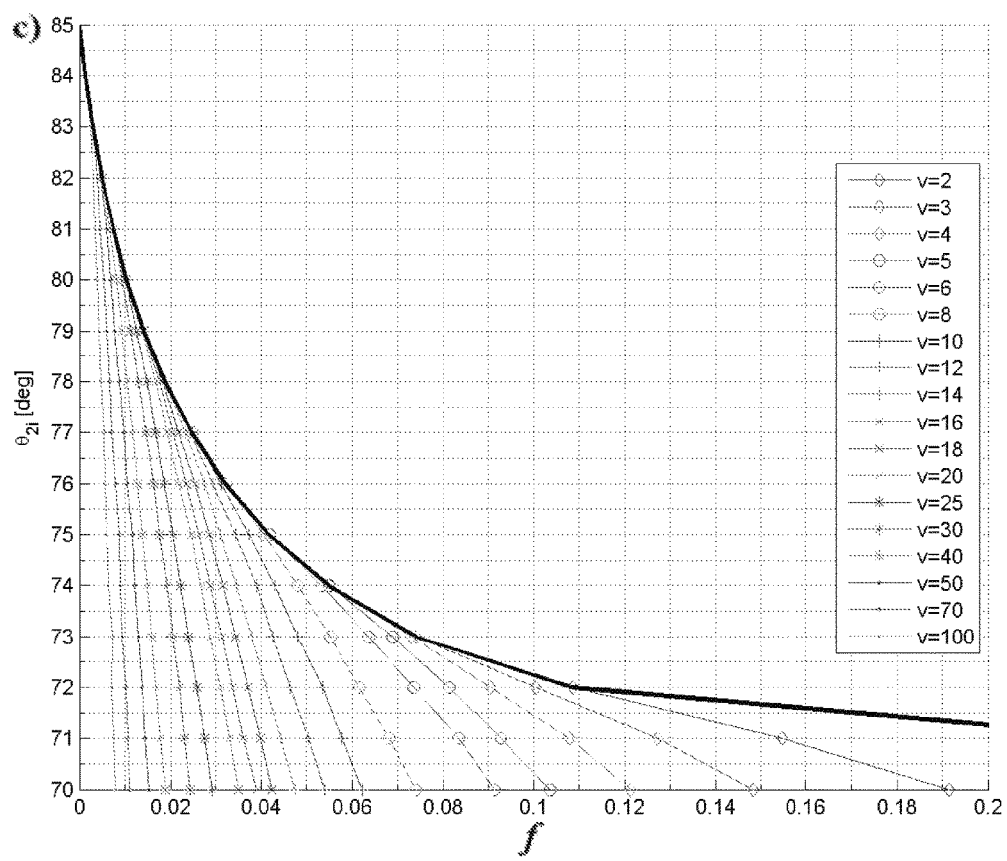
FIG. 9C is a design plot generated using the LBCCSM model that depicts the three selected values of ($\theta_1$), the relationship between ($\theta_{2i}$) and (f), presented over a range of stiffness coefficient ratios (v).

In an embodiment, illustrated in FIG. 6A, the claimed subject matter is a method of designing a linear bi-stable crank-slider mechanism that is constrained by the maximum area the mechanism will occupy and the maximum linear deflection of the mechanism. Design inputs 700 and 702 are inserted into equation 32 (704) to produce length of first segment 706. This information is used in equation 33 (708) to produce length of second segment 710. The additional information is then used in equation 34 (712) to produce initial angle at which the second segment lies 714. Chosen maximum vertical deflection 716 is then used to find the stiffness coefficient ratio 720 from FIGS. 7A-7C 718. FIGS. 8A-8C (722) are then used to find the PRBM angle of first segment 726 at maximum vertical deflection. Design inputs 732 are then inserted into equation 35 (728) to produce width of first segment 730. This information is used in equation 36 (742) to produce width of second segment 744. FIGS. 9A-9C 724 are then used to find non-dimensional force 734. Design input 740 is then added into equation 37 (736) to produce maximum actuation force 738.

Figure 6B:
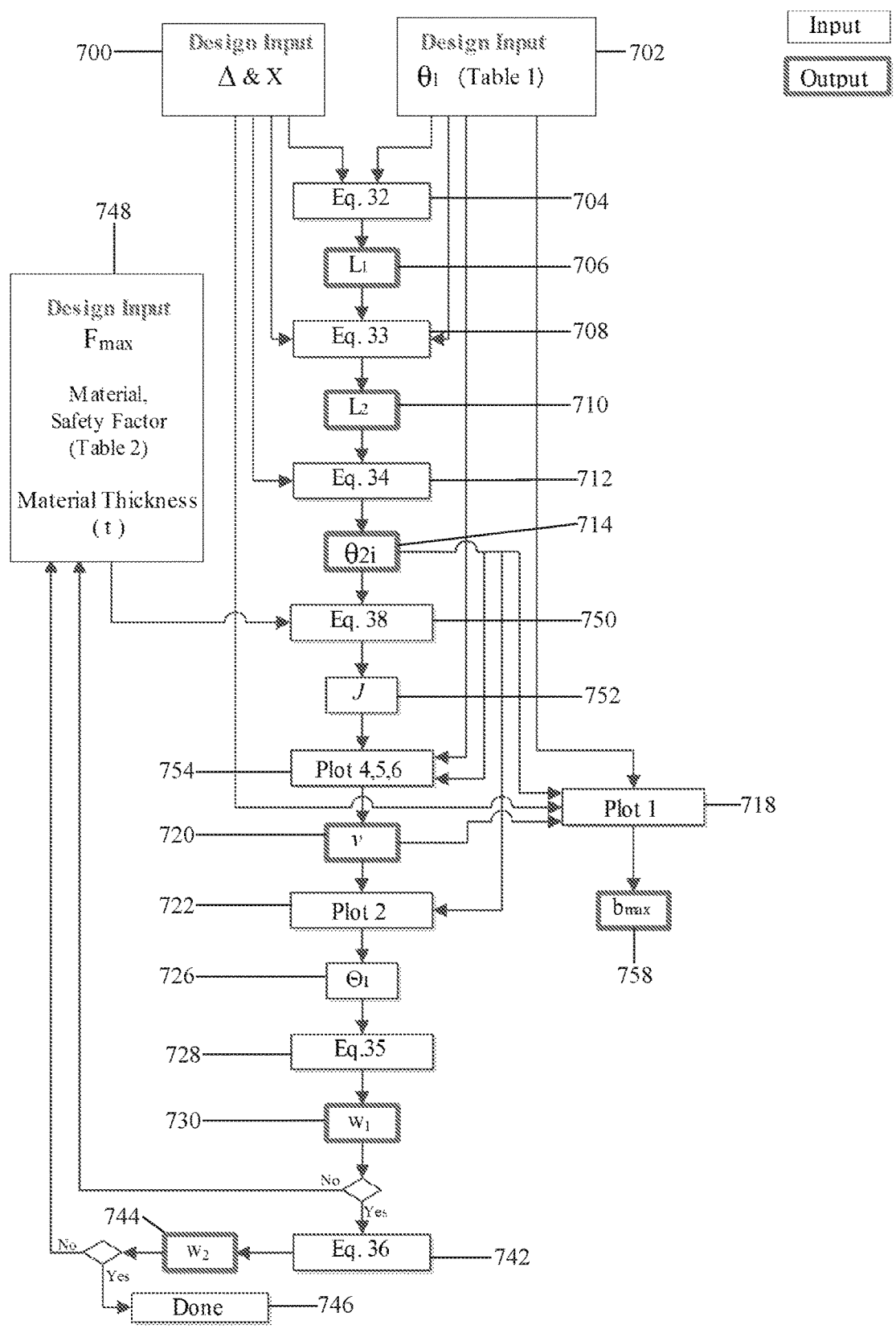
FIG. 6B is a design flow chart for the second approach.
Figure 7A:
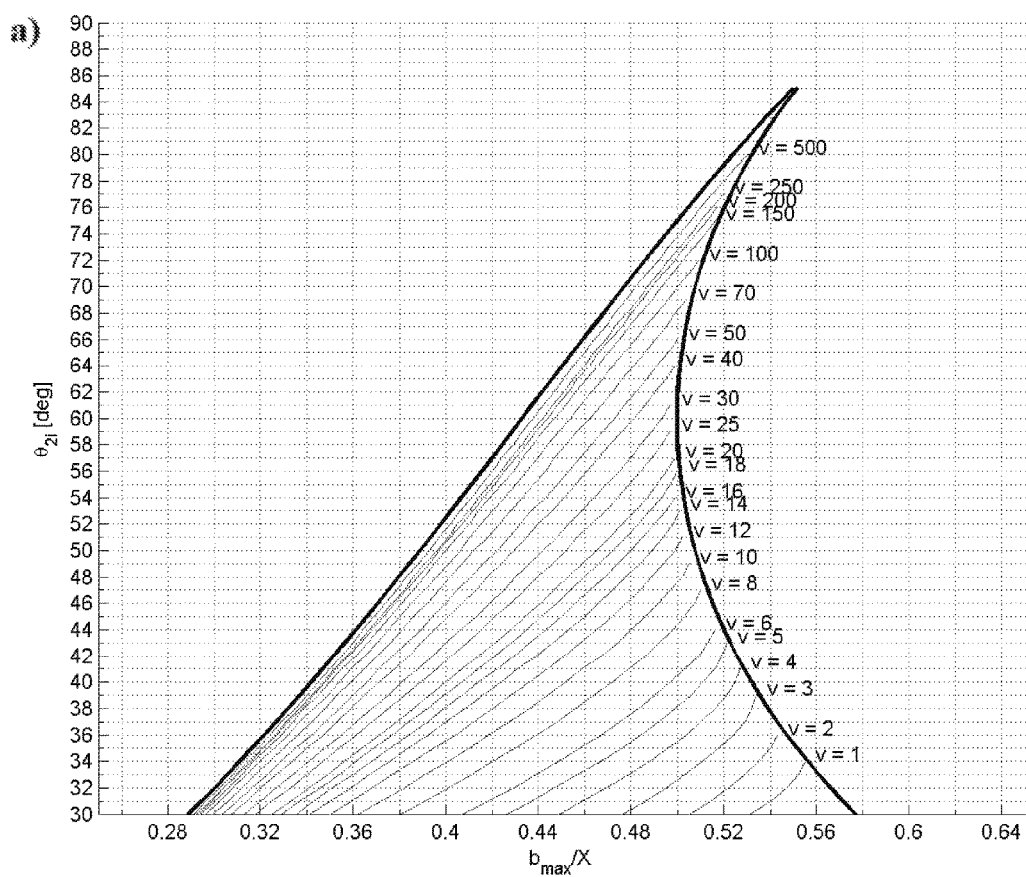
FIG. 7A is a design plot generated using the LBCCSM model that depicts the three selected values of ($\theta_1$), the relationship between ($b_{max}/X$) and ($\theta_{2i}$), presented over a range of stiffness coefficient ratios (v).
Figure 7B:
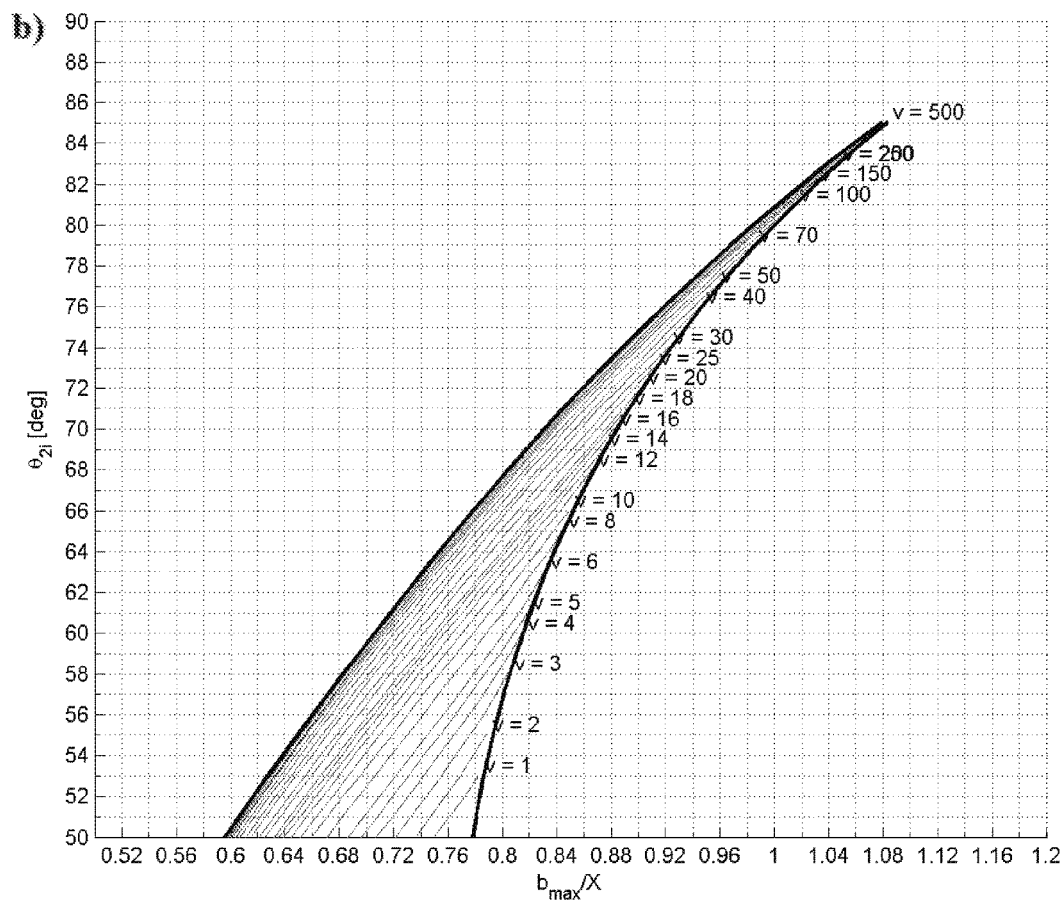
FIG. 7B is a design plot generated using the LBCCSM model that depicts the three selected values of ($\theta_1$), the relationship between ($b_{max}/X$) and ($\theta_{2i}$), presented over a range of stiffness coefficient ratios (v).
Figure 7C:
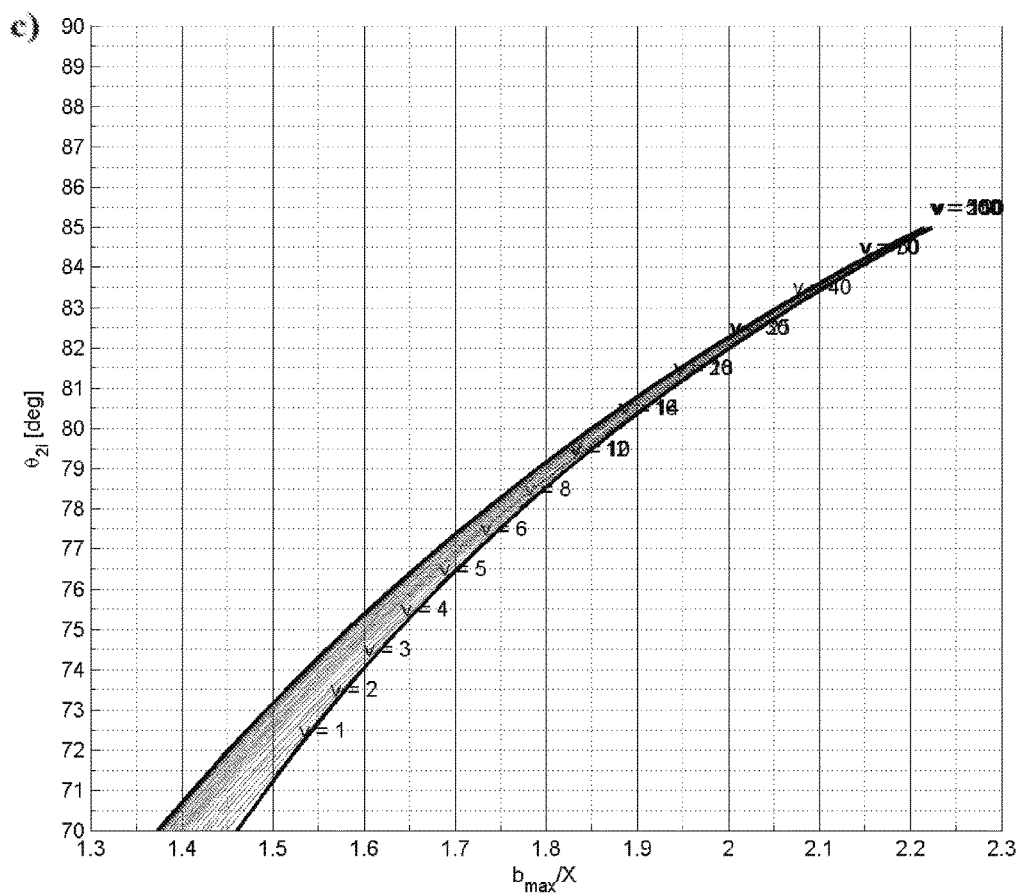
FIG. 7C is a design plot generated using the LBCCSM model that depicts the three selected values of ($\theta_1$), the relationship between ($b_{max}/X$) and ($\theta_{2i}$), presented over a range of stiffness coefficient ratios (v).
Figure 10A:
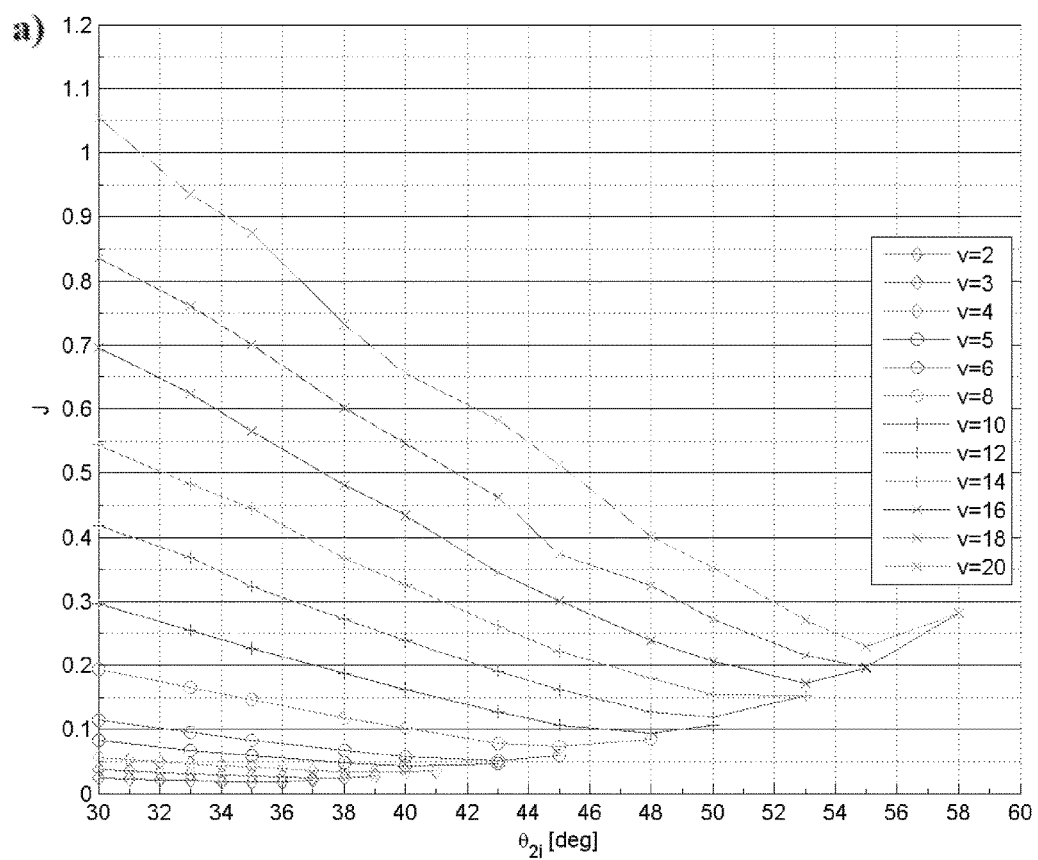
FIG. 10A is a design plot generated using the LBCCSM model used to find a low range of (v) after calculating (J), considering a low force range and ($\theta_{2i}$) between 30°-50°.
Figure 10B:
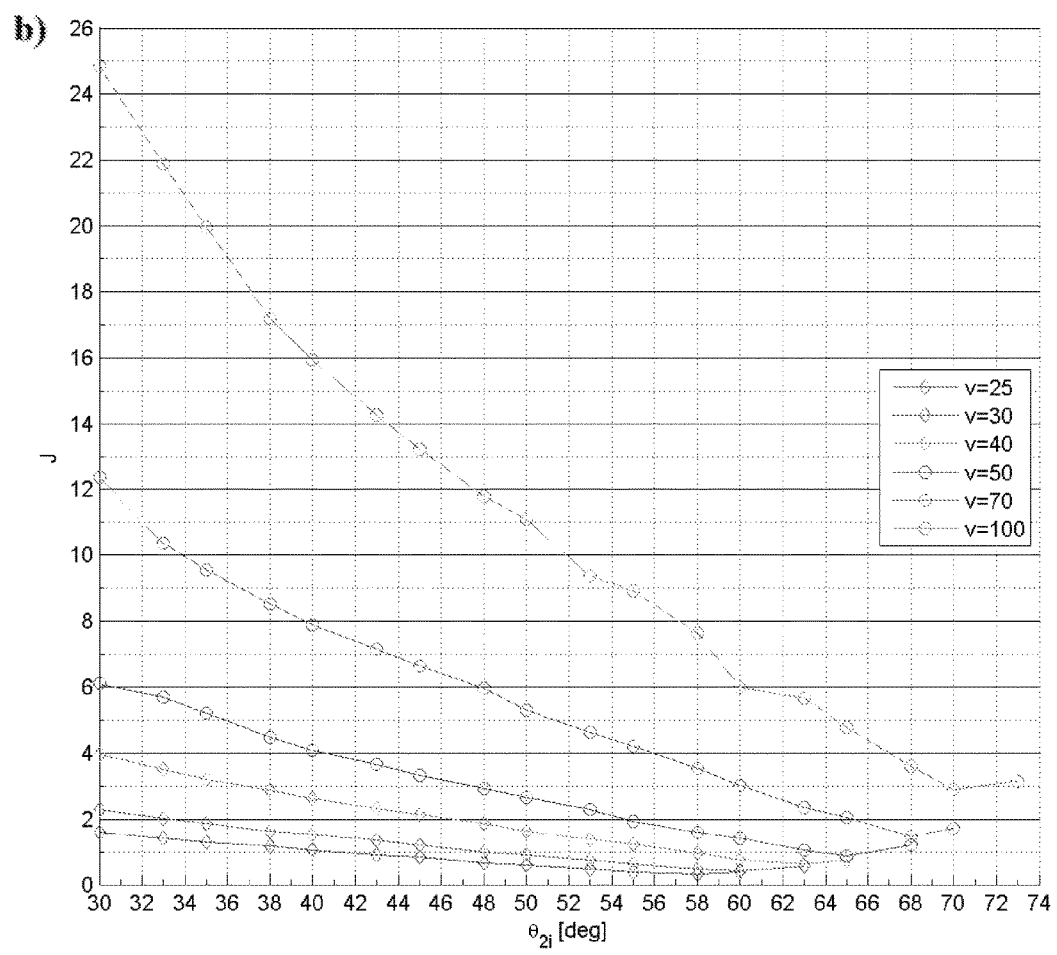
FIG. 10B is a design plot generated using the LBCCSM model used to find a high range of (v) after calculating (J), considering a high force range and ($\theta_{2i}$) between 30°-50°.
Figure 11A:
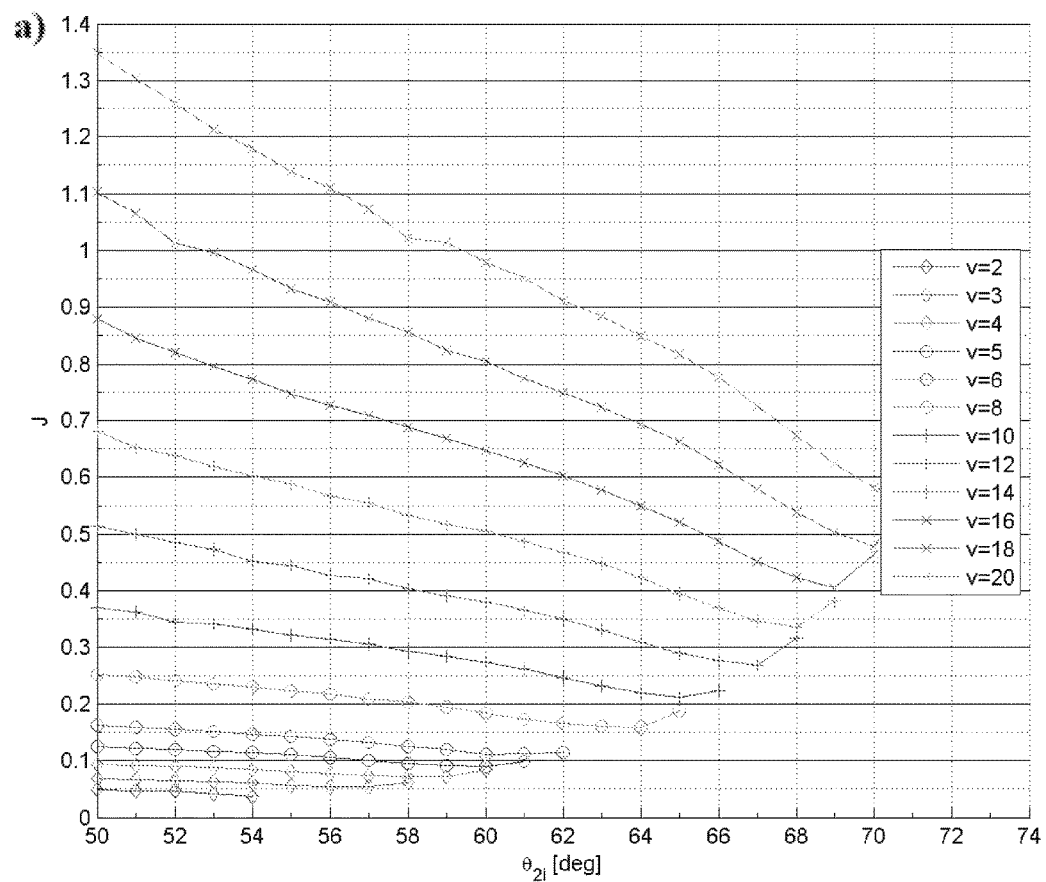
FIG. 11A is a design plot generated using the LBCCSM model used to find a low range of (v) after calculating (J), considering a low force range and ($\theta_{2i}$) between 50°-70°.
Figure 11B:
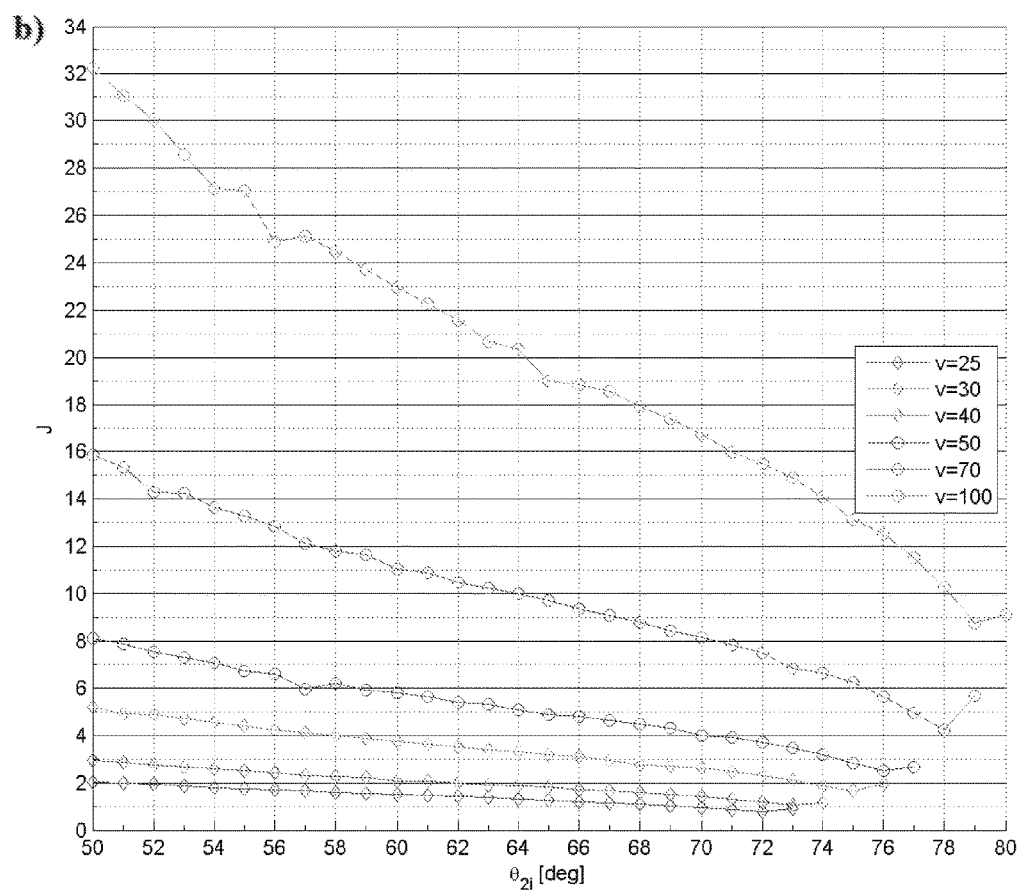
FIG. 11B is a design plot generated using the LBCCSM model used to find a high range of (v) after calculating (J), considering a high force range and ($\theta_{2i}$) between 50°-70°.
Figure 12A:
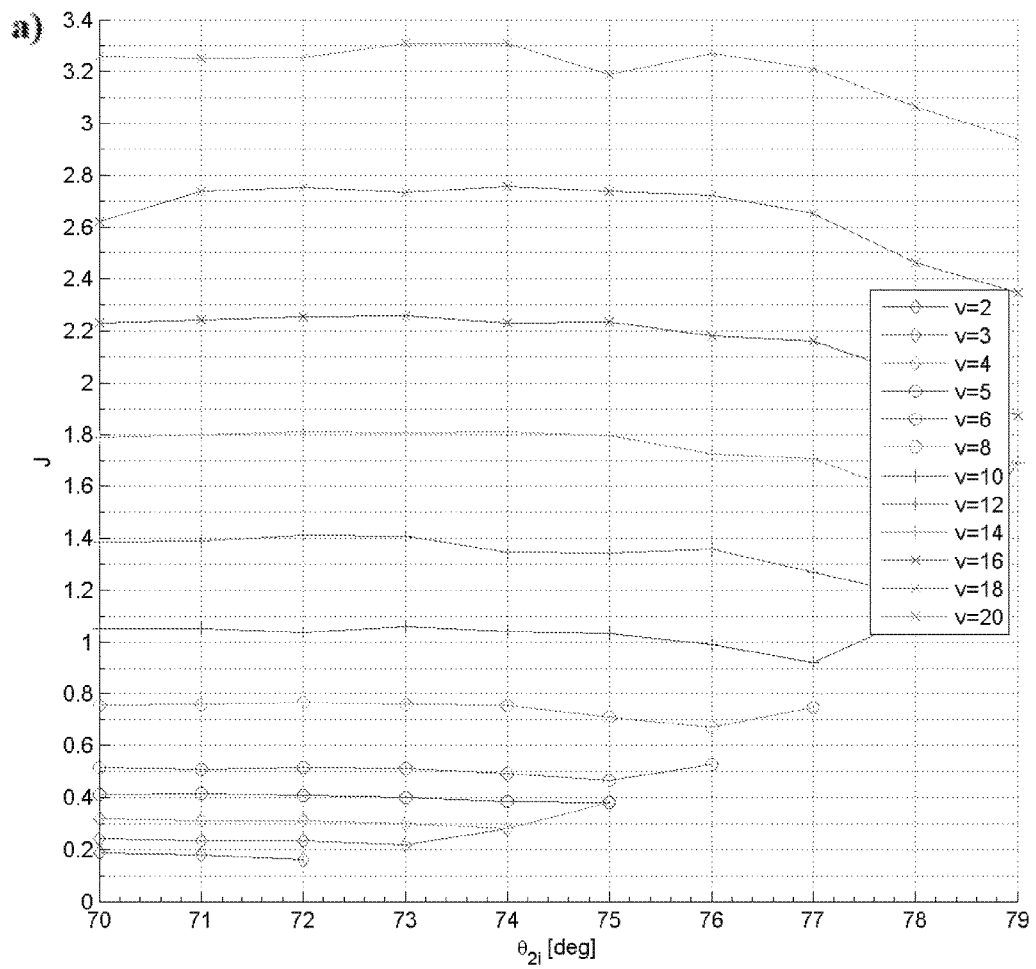
FIG. 12A is a design plot generated using the LBCCSM model used to find a low range of (v) after calculating (J), considering a low force range and ($\theta_{2i}$) between 70°-80°.
Figure 12B:
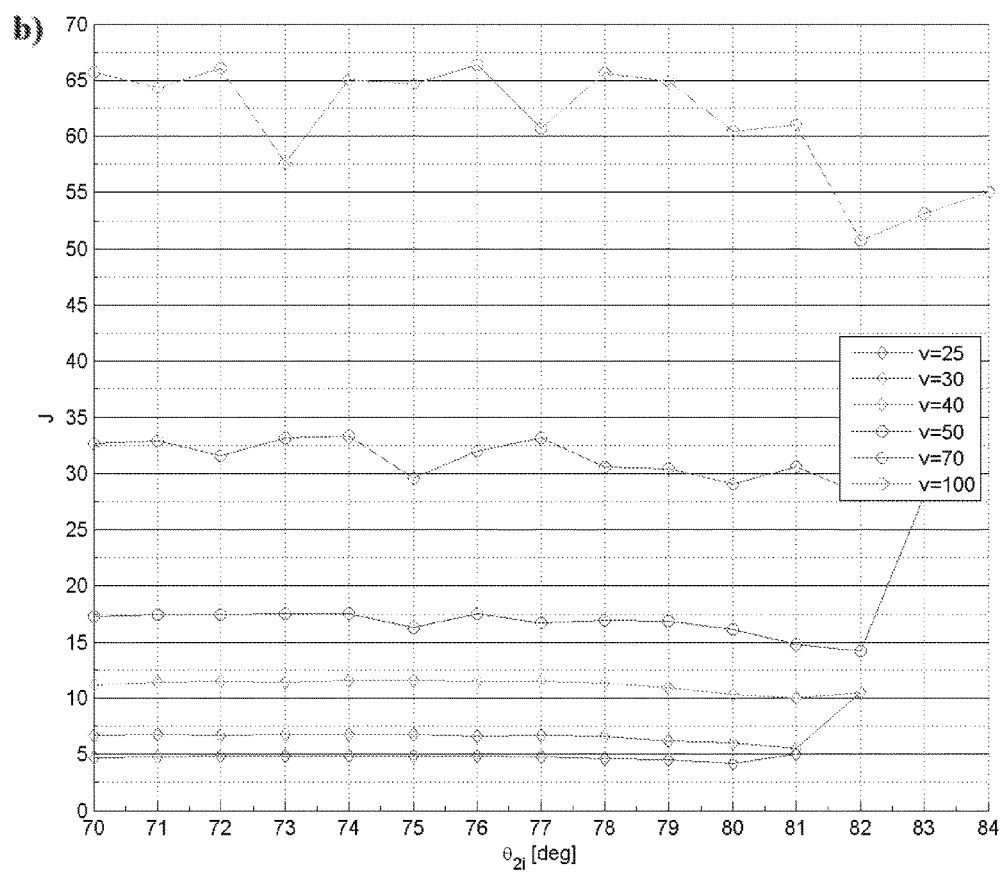
FIG. 12B is a design plot generated using the LBCCSM model used to find a high range of (v) after calculating (J), considering a high force range and ($\theta_{2i}$) between 70°-85°.

Referring now to FIG. 6B, another method is shown for designing a linear bi-stable crank-slider mechanism that is constrained by maximum force required to actuate and maximum deflection of mechanism. Design inputs 700 and 702 are inserted into equation 32 (704) to produce length of first segment 706. This information is used in equation 33 (708) to produce length of second segment 710. The additional information is then used in equation 34 (712) to produce initial angle at which the second segment lies 714. Design inputs 748 are then inserted into equation 38 (750) to calculate the non-dimensional coefficient 752. FIGS. 10A, 11A, and 12A (754) are chosen to find stiffness coefficient ratio 720 for lower force ranges. FIGS. 10B, 11B, and 12B (754) are chosen to find stiffness coefficient ratio 720 for higher force ranges. FIGS. 8A-8C (722) are then used to find the PRBM angle of first segment 726 at maximum vertical deflection. Design inputs 748 are then inserted into equation 35 (728) to produce width of first segment 730. This information is used in equation 36 (742) to produce width of second segment 744. Chosen stiffness coefficient ratio 720 is then used to find maximum vertical deflection 758 from FIGS. 7A-7C (718).

Using one or more of the foregoing methodologies, or variations thereof, the linear bi-stable crank-slider mechanism can be designed and fabricated 746.

EXAMPLE

The fixed-pinned PRBM model was used to model the first segment ($L_1$), as shown in FIGS. 1A-1B, and the second segment ($L_2$) was modeled based on the initially curved pinned-pinned PRBM, as shown in FIGS. 2A-2B. The PRBM constants used were recommended by Howell [Howell, L. L., Compliant Mechanisms, Wiley, New York, 2001] as follows:

| | |
|---|---|
| Characteristic radius (Fixed-Pinned) | $\gamma = 0.85$. |
| Characteristic radius (Pinned-Pinned) | $\rho = 0.85$. |
| Stiffness coefficient | $K_\Theta = 2.65$. |

I. LBCCSM MODELING

The model's equations were derived by solving both the kinematic and virtual work equations. The notations and parameters used, as well as a sketch of the model, are shown in FIG. 3. The points 306 and 308 are compliant joints, and are considered small length flexural pivots, which derive their characteristic motion though bending [4]. Kinematic equations were utilized to calculate the kinematic coefficient, which can then be substituted into the virtual work equations. The model's equations were then solved numerically and represented as plots.

The parameters used herein and their definitions are as follows:

$L_1 L_2$ length of the first and second segments, respectively [mm].

$\theta_1$ angle at which the first segment lies (CW) [deg].

$\theta_{2i}$ initial angle at which the second segment lies (CCW) [deg].

$\theta_2$ changing angle of second segment lies (counter clockwise) [deg].

$\Theta_1$ the PRBM angle of segment 1 [deg].

$\Theta_2$ the PRBM angle of segment 2 [deg].

$\gamma$ Characteristic radius (Fixed-Pinned)=0.85.

$\rho$ Characteristic radius (Pinned-Pinned)=0.85.

$K_\Theta$ Stiffness Coefficient=2.65.

$\omega_1 = \Theta_1 + \theta_1$ $\omega_2 = \Theta_1 + \Theta_2 + \theta_1 + \theta_2$ $\omega_3 = \Theta_1 + \theta_1 + \theta_2$ $\omega_4 = \Theta_1 - \Theta_2 + \theta_1 + \theta_2$ $K_1$ characteristic pivot stiffness of segment 1 [N·mm].
$K_2$ characteristic pivot stiffness of segment 2 [N·mm].
X, x changing distance between point A and point C [mm].
Δ output displacement from point C to point C".
F, M applied force [N] and moment [N·m] respectively.
V total spring energy of the characteristic pivots.
E Young's modulus [N/mm²].
$\sigma_y$ the yield stress [MPa].
SF the safety factor.
m initial angles ratio.
v stiffness coefficient.
f non-dimensional force.
$I_1$ $2^{nd}$ moment of area of segment 1 [mm⁴].
$I_2$ $2^{nd}$ moment of area of segment 2 [mm⁴].
t material thickness [mm].
$w_1$ first segment's width [mm].
$w_2$ second segment's width [mm].
$F_t$ tangential force at the tip of segment 1 [N].
$F_B$ the buckling force of segment 2 [N].
F the passive force from the $F_B$ component [N].
J non-dimensional force-flexibility coefficient.

The LBCCSM model behaves in two different ways depending on the design parameters. In the first case, only segment 1 will experience the deflection, whereas segment 2 remains un-deflected and will only act as a force/displacement transmitter, as can be seen in FIG. 4. In the second case, both segments experience some sort of deflection, i.e., bending of segment 1 and buckling of segment 2, as shown in FIG. 5A. Both cases are presented herein with their corresponding equations, as well as the critical angles at which segment 2 buckles. Considering designs in which segment 2 buckles allow for smaller footprints, which may be important in some applications.

FIGS. 5B-5C show the notation, used in this analysis and illustrates the relationship between the LBCCSM model and its equations. The Pseudo-Rigid-Body Model splits segment 1 into two parts:

$$L_1 = l_{11} + l_{12}, \text{ where}$$

$$l_{11} = (1-\gamma)L_1 \text{ and } l_{12} = \gamma L_1 \quad (1)$$

In a similar manner, segment 2 is divided into three parts when it buckles:

$$L_2 = l_{21} + l_{22} + l_{23}, \text{ where}$$

$$l_{21} = l_{23} = \gamma L_2/2 \text{ and } l_{22} = (1-\gamma)L_2 \quad (2)$$

The characteristic stiffness associated with the Pseudo-Rigid-Body pivot in segment 1 is:

$$K_1 = \gamma * K_\Theta * \frac{E * I_1}{L_1}, \text{ where } I_1 = \frac{tw_1^3}{12} \quad (3)$$

The characteristic stiffness associated with the two Pseudo-Rigid-Body pivots in segment 2 when it buckles is:

$$K_2 = \rho * K_\Theta * \frac{E * I_2}{L_2/2}, \text{ where } I_2 = \frac{tw_2^3}{12} \quad (4)$$

A. The Buckling of Segment 2

The LBCCSM model's critical angles occur when the model switches from being solved using the first case (bending only) to being solved using the second case (bending and buckling). FIG. 5D shows the analysis of the segments' internal forces, which are then used in the PRBM's moment equations.

The moment equation for segment 1, using its characteristic pivot stiffness, is:

$$M = \Theta_1 K_1 = F_t \gamma L_1 \quad (5)$$

From the force analysis illustrated in FIG. 5D:

$$F_t = F_B \sin(\Theta_1 + \theta_1 + \theta_2) \quad (6)$$

$$F_B \geq \left(\frac{\pi^2 E I_2}{L_2^2}\right) \text{ for buckling} \quad (7)$$

Substituting equations (3, 6 and 7) into equation (5) gives the condition for the critical value of ($\theta_2$):

$$K_\Theta \Theta_1 = \left(\frac{\pi^2}{(2 * v * m)}\right) \sin(\Theta_1 + \theta_1 + \theta_2) \quad (8)$$

B. First Case: The Deflection of Segment 1 Only

In the first deflection mode, segment 2 does not buckle, and so the Pseudo-Rigid-Body Model looks like FIG. 4 and equations (2 and 4) do not apply. The loop closure equations for this case are:

$$-x + l_{11} \cos(\theta_1) + l_{12} \cos(\theta_1 + \Theta_1) + L_2 \cos(\theta_2) = 0 \quad (9)$$

$$l_{11} \sin(\theta_1) + l_{12} \sin(\theta_1 + \Theta_1) - L_2 \sin(\theta_2) = 0 \quad (10)$$

The virtual work equations (11 and 12) were obtained after choosing which of the unknowns are independent variables and which are dependent variables. These equations are derived based on ($q_1 = x$ and $q_2 = \theta_2$) being the independent variables and ($\Theta_1$, $\Theta_2$ and F) being the dependent variables.

$$\partial w = F \cdot dx - \frac{\partial V}{\partial q_i} \partial q_i = 0 \quad (11)$$

$$V = \frac{1}{2} K_1 \Theta_1^2 + 2 * \left(\frac{1}{2} K_2 \Theta_2^2\right) \quad (12)$$

The above two equations (11 and 12) were solved for the independent variables and the kinematic coefficients. Since segment 2 is considered rigid in this case, substituting $\Theta_2 = 0$ is essential and results in:

$$-F \cdot dx - \frac{\partial V}{\partial x} dx = 0 \quad (13)$$

$$\frac{\partial V}{\partial x} = K_1 \Theta_1 \frac{\partial \Theta_1}{\partial x} \quad (14)$$

$$\frac{\partial \Theta_1}{\partial x} = -\frac{\cos(\theta_2)}{l_{12} \sin(\Theta_1 + \theta_1 + \theta_2)} \quad (15)$$

The equations are made non-dimensional, in a way that allows for design flexibility, with the use of the following terms:

$$m = \sin(\theta_1)/\sin(\theta_{2i}) = L_2/L_1 \quad (16)$$

$$v = K_1/K_2 \quad (17)$$

$$f = \frac{F}{K_1} = F * \frac{L_1^2}{\gamma K_\Theta EI_1} \quad (18)$$

To non-dimensionalize the first case, equations (14 and 15) were substituted into equation (13), and using equation (18) results in:

$$f + L_1 \Theta_1 \frac{\partial \Theta_1}{\partial x} = 0 \quad (19)$$

The final LBCCSM model's equations for the first case, which were solved numerically, are: equations (9, 10 and 19).

C. Second Case: The Deflection of Both Segments

In this case, both segments experience some deflection, and so the Pseudo-Rigid-Body Model looks like FIG. 5A. The loop closure equations for this case are:

$$-x + l_{11}\cos(\theta_1) + l_{12}\cos(\theta_1 + \Theta_1) + l_{21}\cos(\theta_2 - \Theta_2) + l_{22}\cos(\theta_2) + l_{23}\cos(\theta_2 + \Theta_2) = 0 \quad (20)$$

$$l_{11}\sin(\theta_1) + l_{12}\sin(\theta_1 + \Theta_1) - l_{21}\sin(\theta_2 - \Theta_2) - l_{22}\sin(\theta_2) - l_{23}\sin(\theta_2 + \Theta_2) = 0 \quad (21)$$

Equations (11 and 12) were solved again for the independent variables, resulting in:

$$-F \cdot dx - \frac{\partial V}{\partial x}dx = 0 \quad (22)$$

$$F \cdot \frac{\partial x}{\partial \theta_2}d\theta_2 - \frac{\partial V}{\partial \theta_2}d\theta_2 = 0 \quad (23)$$

Solving for the kinematic coefficients within $\delta V/\delta x$ and $\delta V/\delta \theta_2$ using equations (20) and (21) with $\delta x/\delta \theta_2 = 0$, due to both (x) and ($\theta_2$) being chosen as independent variables, results in:

$$\frac{\partial V}{\partial x} = K_1 \Theta_1 \frac{\partial \Theta_1}{\partial x} + 2K_2 \Theta_2 \frac{\partial \Theta_2}{\partial x} \quad (24)$$

$$\frac{\partial V}{\partial \theta_2} = K_1 \Theta_1 \frac{\partial \Theta_1}{\partial \theta_2} + 2K_2 \Theta_2 \frac{\partial \Theta_2}{\partial \theta_2} \quad (25)$$

$$\frac{\partial \Theta_1}{\partial \theta_2} = \frac{\sin(\Theta_2)}{l_{12}\cos(\Theta_1 + \theta_1 + \theta_2)} \quad (26)$$

$$\frac{\partial \Theta_1}{\partial x} = \frac{l_{22} + 2l_{21}\cos(\Theta_2)}{l_{12}\cos(\Theta_1 + \theta_1 + \theta_2)} \quad (27)$$

$$\frac{\partial \Theta_2}{\partial x} = \frac{\cos(\omega_1)}{2l_{12}\sin(\Theta_2)[\cos(\omega_1)\cos(\theta_2) + \sin(\omega_1)\sin(\theta_2)]} \quad (28)$$

$$\frac{\partial \Theta_2}{\partial \theta_2} = \frac{l_{21}\sin(\omega_2) + l_{22}\sin(\omega_3) + l_{23}\sin(\omega_4)}{l_{21}\sin(\omega_4) - \sin(\omega_2)} \quad (29)$$

To non-dimensionalize the second case, equations (24 and 29) were substitute into (23), and using equations (16 to 18) results in:

$$f + \Theta_1 \frac{\partial \Theta_1}{\partial x} + 2\frac{L_1}{v}\Theta_2 \frac{\partial \Theta_2}{\partial x} = 0 \quad (30)$$

$$\Theta_1 \frac{\partial \Theta_1}{\partial \theta_2} + 2\frac{1}{v}\Theta_2 \frac{\partial \Theta_2}{\partial \theta_2} = 0 \quad (31)$$

The final LBCCSM model's equations for the second case, which were solved numerically, are: equations (20, 21, 30 and 31).

It should be noted that the LBCCSM Matlab numerical simulation uses both cases' equations, i.e., equations (9, 10 and 19) from the first case and equations (20, 21, 30 and 31) from the second case. In addition, the numerical simulation uses the critical angle ($\theta_2$) to switch between being solved using the first case assumptions, to being solved using the second case assumptions. Based on the input parameters, the critical angle ($\theta_2$) can be calculated using equations (8 and 10). Now discussed herein is how the LBCCSM model can be used to create step-by-step design guidelines.

II. DESIGN APPROACHES

Two separate design approaches are presented herein, as different applications may have different input/output requirements. The first approach considers the maximum vertical deflection of the model, while the second approach considers the maximum force. The design parameters used in both approaches are maximum desired deflection, material selection, safety-factor, compliant segments' widths, maximum force required for actuator selection and maximum footprint (i.e., the maximum rectangular area the mechanism can fit inside and move freely without interfering with other components (X) and ($b_{max}$)), as shown in FIGS. 4 and 5A. Other design parameters are contemplated herein as well. In both approaches, the maximum linear deflection is considered as an input, which is a primary purpose of this mechanism.

Both approaches are illustrated using step-by-step guidelines along with flow charts and design plots. As this specification continues, some practical design examples will be provided to illustrate the process of using the design plots. The design plots (FIGS. 7A-12B) are graphical representations of the numerical solution to the model using Matlab. They represent the solution with one of the parameters, ($\theta_1$), preselected as shown in Table 1. The LBCCSM model can work for any value of the first segment's initial angle ($\theta_1$), as long as it satisfies, $50 < \theta_1 < 85°$.

TABLE 1

Selective value of $\theta_1$.

| Initial angle ($\theta_1$) in [deg] | Footprint aspect ratio | Segments' stresses |
| --- | --- | --- |
| 30 | Low | High |
| 50 | Intermediate | Intermediate |
| 70 | High | Low |

The following are descriptions of every design plot generated using the LBCCSM model:

FIGS. 7A-7C:

For the three selected values of ($\theta_1$), the relationship between the different values of maximum footprint ratio ($b_{max}/X$) and the second segment's initial angles ($\theta_{2i}$) is presented over a range of stiffness coefficient ratios (v). The Footprint ratio varies with the change of stiffness ratio (v). The plot illustrates three different types of qualitative solutions. The first type is represented by the rightmost black curve, and shows the footprint ratio when no buckling occurs. The second group of solutions is the minimum limit represented by the left black curve and it occurs when segment 1 is rigid while segment 2 buckles. Between the two limits is the solution that combines the buckling of segment 2 and the bending of segment 1.

FIGS. 8A-8C:

For the three selected values of ($\theta_1$), the relationship between the different values of the first segment's PRBM angle ($\Theta_1$) and the second segment's initial angle ($\theta_{2i}$) is presented over a range of stiffness coefficient ratios (v).

FIGS. 9A-9C:

For the three selected values of ($\theta_1$), the relationship between the different values of the second segment's initial angle ($\theta_{2i}$) and the non-dimensional force (f) is presented over a range of stiffness coefficient ratios (v).

FIGS. 10A-10B, 11A-11B, and 12A-12B:

Each of these plots consider different values of ($\theta_1$), equal to 30°, 50°, and 70° respectively. They are used to find the stiffness coefficient ratios (v) after calculating the non-dimensional force-flexibility coefficients (J). This coefficient is a dimensionless representation of the maximum force and a material flexibility index. FIGS. 10A, 11A, and 12A of the plots consider a low range of stiffness coefficient ratio values corresponding to a lower force range. Alternatively, FIGS. 10B, 11B, and 12B of the plots consider a higher range of both values.

A. The First Approach

In this approach, if the design is only constrained by how much of an area (i.e., footprint) the mechanism will occupy, along with the maximum linear deflection, then the input design parameters are the maximum desired deflection, footprint, material selection, safety factor and material thickness. The output design parameters are the segments' initial angles, the force required to actuate the mechanism and the segments' widths.

i. Flow Chart

A flow chart was developed for this approach, seen in FIG. 6A. This shows the input parameters, plots and equations to use, intermediate outputs, and the final outputs of the design.

ii. Step-By-Step Guidelines

Here are the steps used with the aid of the flow chart in FIG. 6A and the plots (see FIGS. 7A-12B). The order in which inputs and outputs are used is as follows:

Input design parameters:

1—($\Delta$), the mechanism's maximum linear deflection [mm].

2—(X), the maximum horizontal footprint [mm], FIGS. 4-5A.

3—($\theta_1$), the initial angle of segment 1 [deg].

4—($b_{max}$), the maximum vertical footprint [mm], FIGS. 4-5A.

5—The material and safety factor.

6—(t), the material thickness [mm].

Output design parameters:

1—($L_1$ and $L_2$), the segments' length [mm].

2—($\theta_{2i}$), the segments' initial angle [deg].

3—(v), the stiffness coefficient.

4—($w_1$ and $w_2$), the segments' width [mm].

5—($F_{max}$), the maximum actuation force needed [N].

Step 1:

Choose the linear deflection (A), which is the distance between the first stable point and the second stable point. Also, choose the maximum horizontal footprint (X).

Step 2:

Choose a value of ($\theta_1$), the initial angle of segment 1, from Table 1 based on the desired aspect ratio and stress level.

Step 3:

Use equation (32), which is derived from the cosine law based on the segments' angles shown in FIG. 4, to calculate the first segment's length ($L_1$).

$$L_1 = \left(X - \frac{\Delta}{2}\right)\frac{1}{\cos(\theta_1)} \quad (32)$$

Step 4:

Use equation (33) to calculate the second segment's length ($L_2$).

$$L_2 = L_1\sqrt{\left(\frac{\Delta}{2L_1}\right)^2 + (\sin(\theta_1))^2} \quad (33)$$

Step 5:

Use equation (34) to calculate the second segment's initial angle ($\theta_{2i}$).

$$\theta_{2i} = \cos^{-1}\left(\frac{\Delta}{2L_2}\right) \quad (34)$$

Step 6a:

Choose the value of ($b_{max}$), which is the maximum vertical deflection that should satisfy the following condition:

$$(b_i = L_1 \sin(\theta_1)) \leq b_{max} \leq L_2 \quad (35)$$

Step 6b:

Calculate the non-dimensional value of the mechanism's maximum height ($b_{max}/X$). Use the part of FIGS. 7A-7C that is for the selected ($\theta_1$) to find the stiffness coefficient ratio (v).

Step 7:

Use the part of FIGS. 8A-8C that is for the selected ($\theta_1$) to find the PRBM angle of segment 1 ($\Theta_1$) at the maximum vertical deflection.

Step 8:

Use equation (35), along with the material's properties (E, $\sigma_y$) and safety factor selection, to find ($w_1$). Equation (35) was derived using equation (5) and the following equations:

$$\sigma_{max} = M * \frac{c}{I_1} \text{ and } SF = \frac{\sigma_y}{\sigma_{max}} \text{ where } c = \frac{w_1}{2} \quad (35)$$

$$w_1 = \frac{\sigma_y}{SF * E} * \frac{1}{\gamma K_\Theta} * \frac{L_1}{\Theta_1}$$

Table 2 shows some selective materials and their properties.

TABLE 2

| Material selection. | | |
|---|---|---|
| Material Name | Young's modulus E [GPa] | Yield stress $\sigma_y$ [MPa] |
| Polypropylene | 1.35 | 35 |
| HDPE | 1.08 | 29.6 |
| HMWPE | 0.937 | 27 |

Step 9:
Use equation (16) to find the ratio of the initial angles (m). Calculate ($w_2$) using equation (36), which is derived using equations (3, 4, 16 and 17). If the segments' widths are not possible due to reasons such as manufacturing difficulties, repeat step 8 with a different material or safety factor.

$$w_2 = \sqrt[3]{m/(2v)} * w_1 \qquad (36)$$

Step 10:
Use the part of FIGS. 9A-9C that is for the chosen ($\theta_1$) to find the non-dimensional force (f).

Step 11: The maximum actuation force ($F_{max}$) can be calculated using equation (37), which was derived from equation (18). The material thickness, (t), used to calculate the 2nd moment of area, is the same for both segments. If the calculated force is not possible due to actuator limitations, repeat this step with a different material thickness.

$$F_{max} = \frac{\gamma K_\Theta E I_1 f}{L_1^2} \qquad (37)$$

B. The Second Approach

In this approach, if the maximum force required to actuate the mechanism and the maximum deflection are the primary constraints, then the maximum deflection, actuating force, material selection, safety factor and material thickness are considered to be the input parameters while the segments' widths, footprint and the segments' initial angles are considered as the design outputs.

i. Flow Chart

A flow chart was developed for this approach, as seen in FIG. 6B. This shows the input parameters, plots and equations to use, intermediate outputs, and the final outputs of the design.

ii. Step-By-Step Design Guidelines

Here are the steps used with the aid of the flow chart in FIG. 6B and FIGS. 7A-12B. The order in which the inputs and outputs are used is as follows:

Input design parameters:
1—($\Delta$), the mechanism's maximum linear deflection [mm].
2—(X), the maximum horizontal footprint [mm], FIGS. 4-5A.
3—($\theta_1$), the initial angle of segment 1 [deg].
4—($F_{max}$), the maximum actuation force required [N].
5—The material and safety factor.
6—(t), the material thickness [mm].

Output design parameters:
1—($L_1$ and $L_2$), the segments' length [mm].
2—($\theta_{2i}$), the segments' initial angle [deg].
3—(v), the stiffness coefficient ratio.
4—($b_{max}$), the maximum vertical footprint [mm], FIGS. 4-5A.
5—($w_1$ and $w_2$), the segments' width [mm].

Step 1 through Step 5 is the same as in the first approach.

Step 6a:
Specify the maximum force ($F_{max}$) limited by the design, i.e., actuator force limit along with the material used to manufacture the mechanism and its properties, safety factor and material thickness (t). Knowing those inputs, calculate the non-dimensional coefficient (J) using equation (38). This equation was derived from combining both equations (35 and 37).

$$J = \underbrace{\frac{f}{12(\gamma K_\theta)^2 \theta_1^3}}_{\text{From plots (2,3)}} = \underbrace{\frac{F_{max}}{E L_1 t}}_{\text{Unitless Force}} * \underbrace{\left(\frac{SF\;E}{\sigma_y}\right)^3}_{\text{Material Flexibility Index}} \qquad (38)$$

Step 6b:
Use one of the plots of FIGS. 10A-12B, the one that is for ($\theta_1$), to find the stiffness coefficient ratio (v). Choose FIGS. 12A/13A/14A of the plots for lower force ranges, or FIGS. 10B/11B/12B for higher force ranges.

Step 7 through Step 9 is the same as in the first approach.

Step 10:
Use the part of FIGS. 7A-7C that is for the selected ($\theta_1$) along with the stiffness coefficient ratio (v) and ($\theta_{2i}$) to find the value of the mechanism's maximum height ($b_{max}$).

III. DESIGN EXAMPLES

Two examples are provided herein to illustrate the walk-through between the design plots and equations for each individual approach.

A. Example 1: The First Approach i. Using the LBCCSM Model

Design statement: A linear bi-stable mechanism is to be designed. The distance between the two stable points is 25.2 mm, and the mechanism should fit in an area of 43.8 mm by 21 mm. The mechanism is laser cut from a 5 mm thick Polypropylene sheet with design safety factor of 1.

Design inputs: $\Delta$=25.2 mm, X=43.8 mm, $b_{max}$=21 mm, t=5 mm, SF=1. $\gamma$=$\rho$=0.85 and $K_\Theta$=2.65 from the PRBM.

Design Solution:
Step 1: $\Delta$=25.2 mm and X=43.8 mm.
Step 2: From table 1, $\theta_1$=30° for low footprint.
Step 3: Using eq. (32), $L_1$=36.03 mm.
Step 4: Using eq. (33), $L_2$=22 mm
Step 5: Using eq. (34), $\theta_{2i}$=55°.
Step 6a: From inputs, $b_{max}$/X=0.48, bi=18 mm.
Step 6b: Using FIG. 7A, v=25.
Step 7: Using FIG. 9A, $\Theta_1$=7°.
Step 8: Material: Polypropylene, E=1.35 GPa, $\sigma_y$=35 MPa,
Using eq. (35), $w_1$=3.39 mm.
Step 9: Using eq. (16), m=0.61,
Using eq. (36), $w_1$=0.78 mm.
Step 10: Using FIG. 9A, f=0.04.
Step 11: Using eq. (37), $F_{max}$=1.52557 N.

Design conclusion: Following the steps of this approach and guided by the flow chart, the mechanism should be designed and cut as per following:

1—The first segment's length is 36.03 mm at 30° angle clockwise and its width is 3.39 mm.
2—The second segment's length is 22 mm at 55° angle counter clockwise and its width is 0.78 mm.
3—The actuator must be able to provide a force of 1.5227 N.

ii. Using FEA Software (ANSYS Workbench)

The same example was modeled using FEA. The following Table 3 compares results between the LBCCSM model and FEA:

TABLE 3

Example 1: Results Comparisons.

| Type | Parameter | LBCCSM model | FEA model | Error (%) |
|---|---|---|---|---|
| Input | Δ | 25.2 mm | 25.26 mm | 0.237% |
| Input | bmax – bi | 3 mm | 2.7848 mm | 7.72% |
| Output | $F_{max}$ | 1.52556N | 1.4785N | 3.18% |

B. Example 2: The Second Approach i. Using the LBCCSM Model

Design statement: A linear bi-stable mechanism needs to be designed. The distance between the two stable points is 55 mm and the mechanism should fit in a length of 70 mm. The actuator that would be used has a maximum force output of 2 N. The mechanism is laser cut from a 7 mm thick Polypropylene sheet with design safety factor of 1.5.

Design inputs: Δ=55 mm, X=70 mm, $F_{max}$=2 N, t=7 mm, SF=1.5, γ=ρ=0.85 and $K_\Theta$=2.65 from the PRBM.

Design solution:
Step 1: Δ=55 mm and X=70 mm.
Step 2: From table 1, $\theta_1$=50° for intermediate footprint.
Step 3: Using eq. (32), $L_1$=66.12 mm.
Step 4: Using eq. (33), $L_2$=57.63 mm
Step 5: Using eq. (34), $\theta_{2i}$=61.5°.
Step 6a: Using eq. (38), J=0.62.
Step 6b: Using FIG. 11A, v=16.
Step 7: Using FIG. 8B, $\Theta_1$=6.52°.
Step 8: Material: Polypropylene, E=1.35 GPa, $\sigma_y$=35 MPa, Using eq. (35), $w_1$=4.45 mm.
Step 9: Using eq. (16), m=0.87, Using eq. (36), $w_1$=1.34 mm.
Step 10: Using FIG. 7B, $b_{max}/X$=0.78, $b_{max}$=54.6 mm and, $b_i$=50.65 mm.

Design conclusion: Following the steps of this approach and guided by the flow chart, the mechanism should be designed and cut as per following:

1—The first segment's length is 66.12 mm at 50° angle clockwise and its width is 4.45 mm.
2—The second segment's length is 57.63 mm at 61.5° angle counter clockwise and its width is 1.34 mm.
3—The mechanism should fit in an area of 54.6 mm by 70 mm.

ii. Using FEA Software (ANSYS Workbench)

The same example was modeled using FEA. The following Table 4 compares results between the LBCCSM model and FEA. Errors in the model's force estimate are relatively high because the model uses pin joints instead of short-length flexural pivots as in the FEA model. The results show that this model predicts a higher stiffness than the FEA model does. This means that use of flexural pivots at hinges B and C may add flexibility and lower stresses.

TABLE 4

Example 2 Results Comparisons.

| Type | Parameter | LBCCSM model | FEA model | Error (%) |
|---|---|---|---|---|
| Input | $F_{max}$ | 2N | 1.7781N | 12.48% |
| Output | $b_{max} - b_i$ | 3.95 mm | 4.1 mm | 3.65% |

Non-Limiting Illustrative Glossary of Claim Terms

Substantially linear: This term is used herein to refer to arrangement, extension, or other positioning of a structural component along a straight or nearly straight line throughout a majority of a path of travel of said structural component.

Bi-stable: This term is used herein to refer to a mechanism having stability in two (2) distinct positions.

Compliant: This term is used herein to refer a flexible mechanism transferring an input motion, energy, force, or displacement to another point in the mechanism via elastic body deformation. A compliant mechanism gains at least a portion of its mobility through deflection of its flexible components.

Crank-slider mechanism: This term is used herein to refer to a system of mechanical parts working together to transition between linear motion and rotating motion.

Revolute joint: This term is used herein to refer to a flexible flexure bearing made from the same material as the two segments it connects and permits single axis rotation. An example of a revolute joint is a living hinge.

Apex: This term is used herein to refer to an outermost (top/highest or bottom/lowest) point of a structural component, such as a living hinge.

Linear joint: This term is used herein to refer to an end of a crank-slider mechanism that tranverses with minimal friction along a specified axis.

Characteristic pivot: This term is used herein to refer to a structural component associated with a specified central point on which the mechanism turns or oscillates.

Buckling pivot: This term is used herein to refer to a central point on which the mechanism can bend or give way under a specified pressure or strain.

Buckling segment: This term is used herein to refer to a fragment of a link having a length defined by its two buckling pivot ends, both of which can bend or give way under a specified pressure or strain.

Stiffness coefficient ratio: This term is used herein to refer to a factor or multiplier that measures the resistance of the mechanism to deflection or deformation by an applied force.

Measurable deflection: This term is used herein to refer to the changing, bending or causing of a segment in the mechanism to change direction by a definite amount.

Force/displacement transmitter: This term is used herein to refer to a component that causes an applied force to be spread across a segment of the mechanism.

Maximum force required to actuate a shape change: This term is used herein to refer to the greatest force needed to cause the mechanism to transition from one stable position to another stable position.

Maximum linear deflection: This term is used herein to refer to the greatest amount of change, bend or deviation of the mechanism in a direction along a substantially straight line.

Maximum vertical deflection: This term is used herein to refer to the greatest amount of change, bend or deivation of the mechanism in a direction along the y axis.

Non-dimensional value of a maximum height: This term is used herein to refer to the ratio of the measurement of the mechanism in the y axis in one position in relation to the greatest height of the mechanism in they axis.

Non-dimensional force: This term is used herein to refer to a unitless strength, power or effect of the crank-slider mechanism.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the claimed subject matter, it is intended that all matters contained in the foregoing description or shown in the accompanying drawings shall be interpreted as illustrative and not in a limiting sense.

It is also to be understood that the following claims are intended to cover all of the generic and specific features of the claimed subject matter herein described, and all statements of the scope of the claimed subject matter that, as a matter of language, might be said to fall therebetween.

What is claimed is:

1. A method of fabricating a substantially linear, bi-stable, compliant crank-slider mechanism, the method comprising:
producing a first segment having a first end and a second end, the first end of the first segment being fixed in place along an x-axis and a y-axis in the first stable position and the second stable position;
producing a second segment having a first end and a second end;
producing a revolute joint disposed between and coupling the second end of the first segment to the first end of the second segment, wherein the revolute joint forms an apex of the crank-slider mechanism, the revolute joint being movable in the x-axis and the y-axis during transition between the first stable position and the second stable position;
producing a linear joint disposed at the second end of the second segment, the linear compliant joint being slidable only along the x-axis but not movable along the y-axis during transition between the first stable position and the second stable position, such that the linear compliant joint is disposed on the x-axis in the first stable position and the second stable position,
wherein the crank-slider mechanism has a first stable position and a second stable position;
wherein the second end of the second segment being disposed distal to the first end of the first segment in the first stable position, the second end of the second segment being disposed proximal to the first end of the first segment in the second stable position; and
producing a characteristic pivot disposed within the first segment, splitting the first segment into a fixed component and a hinged portion, the fixed component including the first end of the first segment and the hinged portion including the second end of the first segment,
wherein the fixed component remains fixed in place at an angle relative to the x-axis during transition between the first stable position and the second stable position,
whereby the first segment and the second segment maintain a stiffness in a direction normal to a surface of the crank-slider mechanism in the first stable position and the second stable positions;
wherein a first buckling pivot is disposed within the second segment, such that the second segment can rotate about the first buckling pivot; and
wherein a second buckling pivot is disposed within the second segment, thus forming a buckling segment between the first buckling pivot and the second buckling pivot.

2. The method of claim 1, further comprising:
the hinged component and the fixed component of the first segment being straight in the first stable position and angled relative to each other in the second stable position.

3. The method of claim 1, wherein the buckling segment remains fixed between the first buckling pivot and the second buckling pivot.

4. The method of claim 1, wherein
when a force is applied to the linear bi-stable surface, the first segment experiences a measurable deflection, and
when the force is applied to the linear bi-stable surface, the second segment is a displacement transmitter or experiences a measurable deflection.

5. The method of claim 1, wherein the angle between the x-axis and the fixed component of the first segment is greater than 5° and less than 85°.

6. The method of claim 1, wherein the second segment has an angle in the first stable position that is presented over a range of stiffness coefficient ratios.

7. The method of claim 1, wherein displacement of the linear compliant joint along the x-axis is parallel to a force applied to transition the compliant crank-slider mechanism between the first stable position and the second stable position.

8. The method of claim 1, wherein the first and second segments are rigid.

9. The method of claim 1, wherein the first and second segments are flexible.

10. The method of claim 1, wherein the revolute joint is a living hinge.

11. The method of claim 1, wherein the hinged portion rotates in a counterclockwise direction from the first stable position to the second stable position and in a clockwise direction from the second stable position to the first stable position.

* * * * *